Nov. 9, 1965 S. HOLMQUIST ETAL 3,216,371

MONORAIL IMPROVEMENTS

Filed April 8, 1963 14 Sheets-Sheet 1

INVENTORS
SIXTEN HOLMQUIST
GUNTHER WENGATZ

Strauch, Nolan & Neale
ATTORNEYS

INVENTORS
SIXTEN HOLMQUIST
GUNTHER WENGATZ
BY
Strauch, Nolan & Neale
ATTORNEYS

INVENTORS
SIXTEN HOLMQUIST
GUNTHER WENGATZ

BY Strauch, Nolan & Neale
ATTORNEYS

INVENTORS
SIXTEN HOLMQUIST
GUNTHER WENGATZ
BY Strauch, Nolan & Neale
ATTORNEYS

INVENTORS
SIXTEN HOLMQUIST
GUNTHER WENGATZ
BY Strauch, Nolan & Neale
ATTORNEYS

INVENTORS
SIXTEN HOLMQUIST
GUNTHER WENGATZ
BY Strauch, Nolan & Neale
ATTORNEYS

INVENTORS
SIXTEN HOLMQUIST
GUNTHER WENGATZ

BY Strauch, Nolan & Neale
ATTORNEYS

INVENTORS
SIXTEN HOLMQUIST
GUNTHER WENGATZ
BY Strauch, Nolan & Neale
ATTORNEYS

Nov. 9, 1965 S. HOLMQUIST ETAL 3,216,371

MONORAIL IMPROVEMENTS

Filed April 8, 1963 14 Sheets-Sheet 9

INVENTORS
SIXTEN HOLMQUIST
GUNTHER WENGATZ

BY Strauch, Nolan & Neale
ATTORNEYS

INVENTORS
SIXTEN HOLMQUIST
GUNTHER WENGATZ
BY Strauch, Nolan & Neale
ATTORNEYS

INVENTORS
SIXTEN HOLMQUIST
GUNTHER WENGATZ

BY Strauch, Nolan & Neale
ATTORNEYS

INVENTORS
SIXTEN HOLMQUIST
GUNTHER WENGATZ
BY Strauch, Nolan & Neale
ATTORNEYS

INVENTORS
SIXTEN HOLMQUIST
GUNTHER WENGATZ
BY
Strauch, Nolan & Neale
ATTORNEYS

Nov. 9, 1965 S. HOLMQUIST ETAL 3,216,371

MONORAIL IMPROVEMENTS

Filed April 8, 1963 14 Sheets-Sheet 14

INVENTORS
SIXTEN HOLMQUIST
BY GUNTHER WENGATZ

Strauch, Nolan & Neale
ATTORNEYS

United States Patent Office
3,216,371
Patented Nov. 9, 1965

3,216,371
MONORAIL IMPROVEMENTS

Sixten Holmquist, New York, N.Y., and Gunther Wengatz, Seattle, Wash., assignors to Wegematic Corporation, New York, N.Y., a corporation of Delaware Filed Apr. 8, 1963, Ser. No. 271,206
20 Claims. (Cl. 105—145)

The present invention relates to monorail vehicle improvements generally and more particularly to improvements in the well known "Alweg" type of over-riding monorail vehicle in which the vehicle body is supported astride a monobeam with the load carrying floors above the track. Various aspects of the invention are, however, applicable to the suspended types of monorail vehicle in which the load carrying bodies are suspended below the supporting track.

This application is a continuation-in-part of our now abandoned application Serial No. 103,338, filed April 17, 1961.

In most of the prior "Alweg" type vehicles, multi-axle trucks are used to support the vehicle bodies on load carrying and driving wheels which extend into wheel housings above the load car floor level at the body ends adjacent its longitudinal center line. The trucks are guided along the monobeam by side guide wheels that engage the monobeam side surfaces and the bodies are rotatably supported from truck bolsters to permit operation on curves. In such vehicles the size of and protrusion of the wheel housings above the load carrying floor level reduces the capacity of the vehicles and may interfere with ingress and egress through car side doors, and of passage between cars and articulated car sections.

A primary objective of the present invention therefore is to provide novel over-riding monorail car truck, driving, and body constructions providing a through level floor with maximum load carrying capacity, increased convenience of passenger loading and unloading and greater safety and comfort.

The foregoing objective is accomplished by coordination of novel single axle truck and drive arrangements which permit the use of wheel housings that protrude above the car floor sufficiently to adequately house the wheels and that may be fully utilized for passenger seating at comfortable chair seat height with adequate aisle space at the car sides for passage around the passengers seated on the housings and from doors and car to car.

On short radii curvatures encountered in urban monorail transportation, the side slip of the load carrying wheel tires causes excessive wear and maintenance. Another object of the present invention is to eliminate such excessive wear and to provide improved comfort of passenger ride. This is accomplished by providing novel specially designed wide tread tires with a minimum lateral stability, with adequate load carrying characteristics to function on curves of radii as small as 600 feet even at high speed without excessive destructive slip wear. However, considerably shorter curves must be used in congested city and urban areas, for passenger service with cars of reasonable passenger carrying capacity. For example, at the World's Fair in the city of Seattle, Washington, an installation based on the present invention operates upon a track having curves of a radius of curvature as short as 220 feet. For negotiating such short radius curves, in addition to use of the specially designed flexible side wall tires, a novel steerable bogie embodying a single load carrying axle and wheel assembly is provided. A dual wheel assembly supports the load carrying axle using special 15 x 19.5 dual pneumatic tires that support loads up to 22,000 lbs. To provide relatively high passenger carrying capacity, multiple articulated body sections are provided to form an integrated car assembly. Each of such sections is supported adjacent its ends by one of our improved steering truck assemblies. The car sections are of such length and the trucks are so spaced as to provide reasonable tire life with heretofore unattained comfort of ride which is enhanced by use of body mounted drive motors, transmission gearing and brake equipment mounted on the body framing connected to the bogie mounted driving axles by flexible drive connections to compensate for relative body and bogie motion. In addition, the bogie assembly, according to the present invention, includes a novel torsion spring suspension for side guide wheels to effectively resist sidesway and car tilt and to provide an improved cushioned and guided ride during operation of monorail cars equipped with such bogies.

A further object of the present invention resides in the provision of a novel spring biased linkage suspension for suspending the frame of the bogie assembly on the single load carrying axle.

A further object of the present invention resides in the provision of a monobeam vehicle in which two novel identically constructed bogie assemblies are employed to support the vehicle at opposite ends on the monobeam with each bogie assembly having only one spring for suspending the bogie frame on a single load carrying axle.

Still a further object of the present invention resides in the provision of a novel compact and rugged single drive axle unit for a steerable monobeam bogie assembly.

These and other objects of the present invention will become more fully apparent by reference to the appended claims and as the following detailed descriptions proceed by reference to the accompanying drawings wherein:

Figure 1:
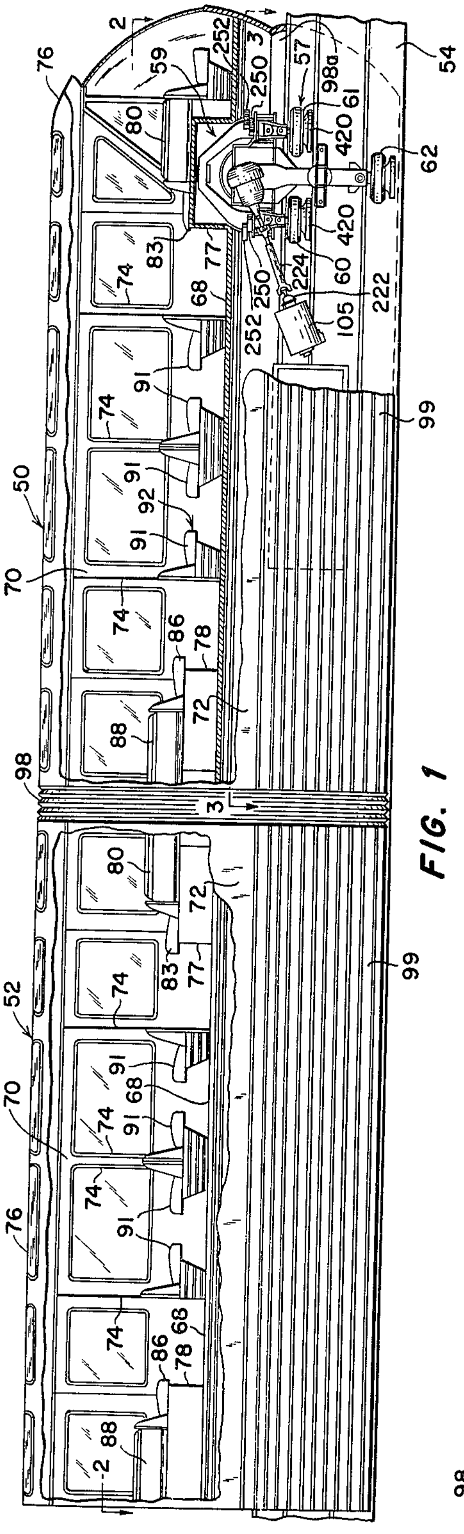
FIGURE 1 is a side elevational view of a pair of coupled cars of a monobeam supported train constructed in accord with the principles of the present invention with portions of the side walls of the car bodies broken away to illustrate interior details of the passenger space and of the bogie assemblies supporting the cars on the monobeam.
Figure 2:
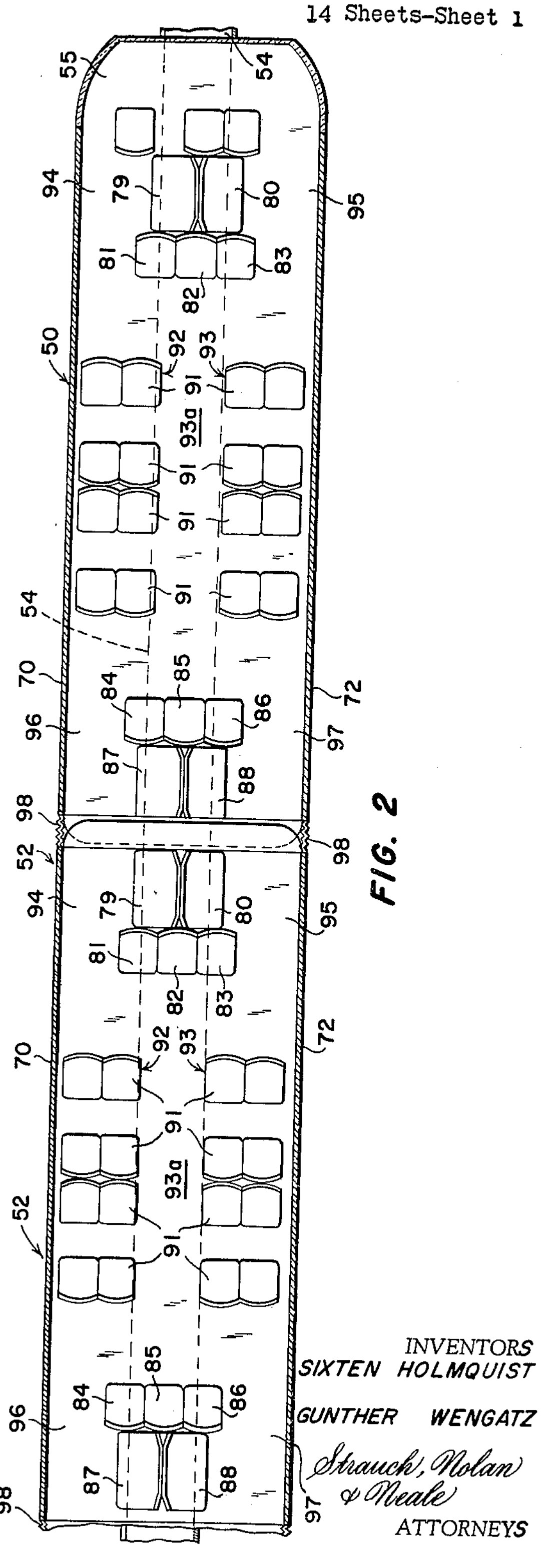
FIGURE 2 is a section taken substantially along lines 2—2 of FIGURE 1 and illustrating the seating arrangement within the body of each car.
Figure 3:
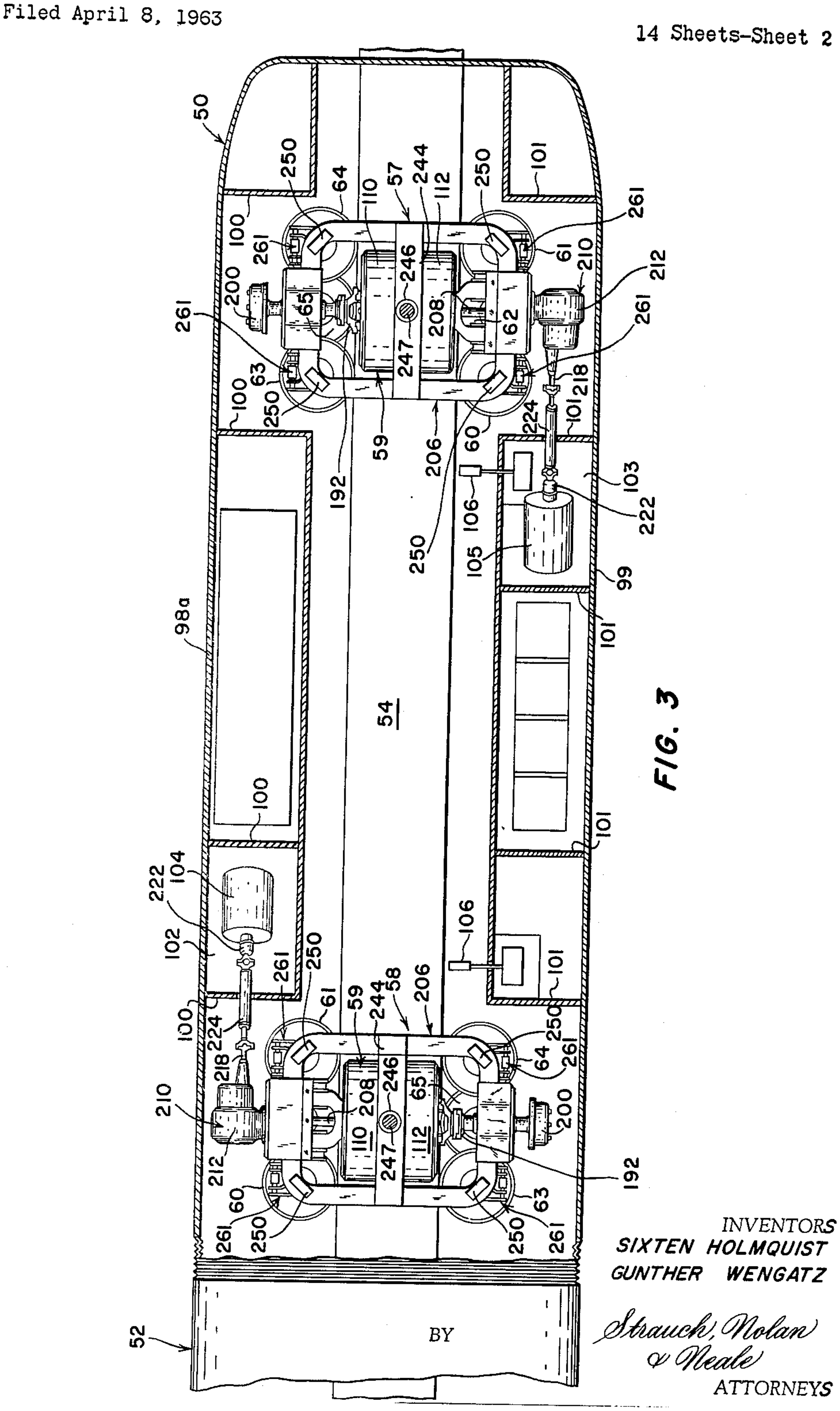
FIGURE 3 is an enlarged section taken substantially along lines 3—3 of FIGURE 1.

Referring now in detail to the drawings and particularly to FIGURES 1–3, the train of the present invention comprises a plurality of monorail cars of which cars 50 and 52 are exemplary. As shown, cars 50 and 52 are coupled together for travel along a rigid generally rectangular monobeam structure 54 adapted to be supported at a suitable elevation above the ground by a series of pylons (not shown). Car 50 is provided with a forward operator's compartment or stall indicated at 55 (FIGURE 2) and containing driving controls (not shown) to enable car 50 to be used as a lead car. Car 52 may also contain driving controls but is constructed without the specially formed operator's compartment 55 and is adapted for use as intermediate or rearmost trailing car. Cars 50 and 52 are otherwise substantially identical in construction and accordingly, only car 50 will be described in detail with like reference numerals designating like parts in car 52.

Thus, with continued reference to FIGURES 1–3, car 50 is supported upon monobeam 54 independently of car 52 solely by a pair of identically constructed forward and rearward truck or bogie assemblies 57 and 58 (FIGURE 3) disposed at opposite ends of the car. Bogie assemblies 57 and 58 are each provided with a beam engaging load carrying dual wheel assembly 59 supporting car 50 for movement along monobeam 54. Dual wheel assemblies, such as assemblies 59, are preferably used for relatively high load carrying capacity cars, whereas single wheel assemblies (not shown) may be used for smaller load carrying capacities.

In a manner to be hereinafter described in detail, each of the bogie assemblies 57 and 58 is pivotable relative to the car body about upstanding axes under the control of a set of tilt resistant guide and stabilizing side wheels 60, 61, 62, 63, 64 and 65 (FIGURES 1 and 4) engaging the opposite planar side faces of monobeam 54 to maintain each bogie assembly in centered relation on beam 54. The wheel assemblies 59 for each car 50 and 52 may be either power driven or trailer wheels depending on the service required.

With continued reference to FIGURES 1 and 2, the body of car 50 is formed with a flat reinforced floor 68 and parallel upstanding side walls 70 and 72. Floor 68 is supported by bogie assemblies 57 and 58 at a level slightly above the top of monobeam 54 with the rotational axes of the wheel assemblies 59 being parallel to and extending between the top of monobeam 54 and the bottom of floor 68. Side walls 70 and 72 are rigid with floor 68 and have suitable window and door openings indicated generally at 74. The doors are preferably located adjacent opposite ends of car 50 and a roof 76 (FIGURE 1) extends between and is supported by side walls 70 and 72.

The upper portions of the dual wheel assemblies 59 of bogie assemblies 57 and 58 lie above the level of the floor 68 and respectively project into forward and rearward inverted box-shaped wheel housings 77 and 78 (FIGURE 1) protruding above the top surface of the floor 68 centrally between side walls 70 and 72. This low level construction with floor 68 spaced closely to beam 54, as will become more apparent as the description proceeds, establishes a low center of gravity to minimize sidesway of car 50 and thereby promote stabilized high speed travel.

To avoid loss of seating and aisle space due to the projection of the wheel housings 77 and 78 above floor 68, housings 77 and 78 are constructed with special dimensions for cooperation with a special seating arrangement in car 50 to provide for the usual ample aisle and seating space.

According to the present invention, the special seating arrangement mentioned above comprises, as best seen from FIGURES 1 and 2, a pair of double capacity seats 79 and 80 each having adequate side-by-side seating space for at least two occupants and being mounted upon the top of housing 77 in back-to-back relationship. Seats 79 and 80, respectively, face side walls 70 and 72 and the bases of seats 79 and 80 are fixed upon the top of wheel housing 77. A set of rearwardly facing seats 81–83 are arranged in side-by-side relation transversely of car 50 over wheel housing 77 adjacent to the rearwardly directed sides of seats 79 and 80. The bases of seats 81–83 are also secured upon the top of housing 77 in the same manner as seats 79 and 80 and are preferably arranged symmetrically about the longitudinal center line of car 50 in the manner shown.

With continuing reference to FIGURES 1 and 2, housing 77 is open at the bottom and closed around the sides and at the top with preferably flat sided plates rigidly fixed together in the form of a box. The top of housing 77 is preferably substantially parallel to floor 68 and is spaced above the level of floor 68 by a vertical distance to position the bases of seats 79–83 at the normal height of a conventional chair seat to assure comfortable seating accommondations for occupants. The width and length of housing 77 respectively extending perpendicular to and parallel with the longitudinal center line of car 50 is such to provide adequate space for wheel assembly 59 and adequate support for seats 79–83 in the seating arrangement described above.

Mounted on housing 78 is a set of side-by-side seats 84–86 corresponding to and facing seats 81–83. The bases of seats 84–86 are secured upon the top of housing 78 and extend transversely across car 50 symmetrically about the longitudinal center line of the car. To the rear of seats 84–86 are two double-capacity seats 87 and 88 which are arranged in back-to-back relationship and which correspond to seats 79 and 80 respectively. The bases of seats 87 and 88 are also secured upon the top of housing 78 such that seats 87 and 88 respectively face side walls 70 and 72. Housing 78 is constructed identically to and with the same dimensions as housing 77.

The remainder of the seats in car 50 are of the common floor-mounted double-capacity couch type and are indicated generally at 91. Seats 91 are arranged in two spaced apart parallel rows 92 and 93 (FIGURE 2) adjacent and parallel to opposite sides of car 50 in conventional railway couch fashion and form a center aisle 93*a* extending along the center line of car 50 between wheel housings 77 and 78. Seats 79–88 and 91 are preferably symmetrically arranged with respect to the longitudinal center line of car 50 in the manner described and shown.

The floor space laterally between housings 77 and 78 and side walls 70 and 72 is free of obstruction to provide aisles 94 and 95 on opposite sides of housing 77 and aisles 96 and 97 on opposite sides of housing 78. Aisles 94–97 are parallel with side walls 70 and 72. The seats 91 at the ends of rows 92 and 93 are spaced inwardly of seats 81–83 and 84–86 to provide aisle space interconnecting center aisle 93*a* with aisles 94–97 at opposite ends of car 50. Aisles 96 and 97 thus provide access to center aisle 93*a* from the rearward end of car 50 and aisles 94 and 95 provide access to aisle 93*a* from the forward end of car 50. By this arrangement, a completely flat floor space for walking is provided from one end of car 50 to the other.

Conventional overlapping slide plates are provided to bridge the space between the floors 68 of the adjacent cars 50 and 52 and the sides and tops of adjacent cars are connected by conventional accordion or bellows connectors 98 to allow cars 50 and 52 to be articulated with respect to each other.

As shown in FIGURE 2, aisles 96 and 97 of car 50 align and merge with aisles 94 and 95 of car 52 to allow an occupant to walk from one car to the other. Thus, an occupant in passing from car 52 to car 50, for example, may walk from aisle 94 of car 52, through aisle 96 of car 50 and into center aisle 93*a* of the latter car.

With the foregoing seating arrangement it is apparent that by utilizing wheel housings 77 and 78 to mount seats 79–88 in the manner described above, the seating capacity of each car is not materially reduced by the projection of housings 77 and 78 from floor 68. In addition, a flat continuous aisle space from one end of the car to the other is provided for.

With continuing reference to FIGURES 1 and 3, the body of car 50 is provideed with compartment forming side skirt portions 98*a* and 99 respectively depending from side walls 70 and 72 in spaced parallel relation to the oppositely facing sides of monobeam 54. Skirt portions 98*a* and 99 thus cooperate with floor 68 to form a downwardly opening channel through which monobeam 54 extends.

As best shown in FIGURE 3, skirt portions 98*a* and 99 are respectively provided with sets of rigid partitions 100 and 101 extending inwardly toward monobeam 54 to form motor compartments 102 and 103 on opposite sides of beam 54. Motors 104 and 105 respectively mounted in compartments 102 and 103 are positioned below floor 68 adjacent to the opposite side faces of monobeam 54 and furnish the power for separately driving the dual wheel assemblies 59 of bogies 58 and 57 respectively. Motors 104 and 105 are preferably identically constructed electric motors and are connected by suitable adapters 106 to electric power cables or rails (not shown) mounted on opposite sides of monobeam 54.

With the monorail car construction thus far described, it is apparent that by mounting motors 104 and 105 along the sides of monobeam 54, a completely flat passenger compartment floor is provided for in car 50 with the exception of projecting housings 77 and 78. By allowing the load carrying dual-wheel assemblies 59 to project above floor 68 and by mounting motors 104 and 105 below the level of the floor and also below the rotational axes of wheel assemblies 59, it is clear that the center of gravity of car 50 is lowered in close proximity to monobeam 54, thus improving the stability of the car in opposition to laterally directed forces, such as wind loads and unequally distributed passenger loads, tending to tilt or laterally shift car 50 to one side or the other.

Since bogie assemblies 57 and 58 are of the same construction as previously mentioned, only assembly 57 will now be described in detail with like reference numerals designating like parts in assembly 58.

Figure 7:
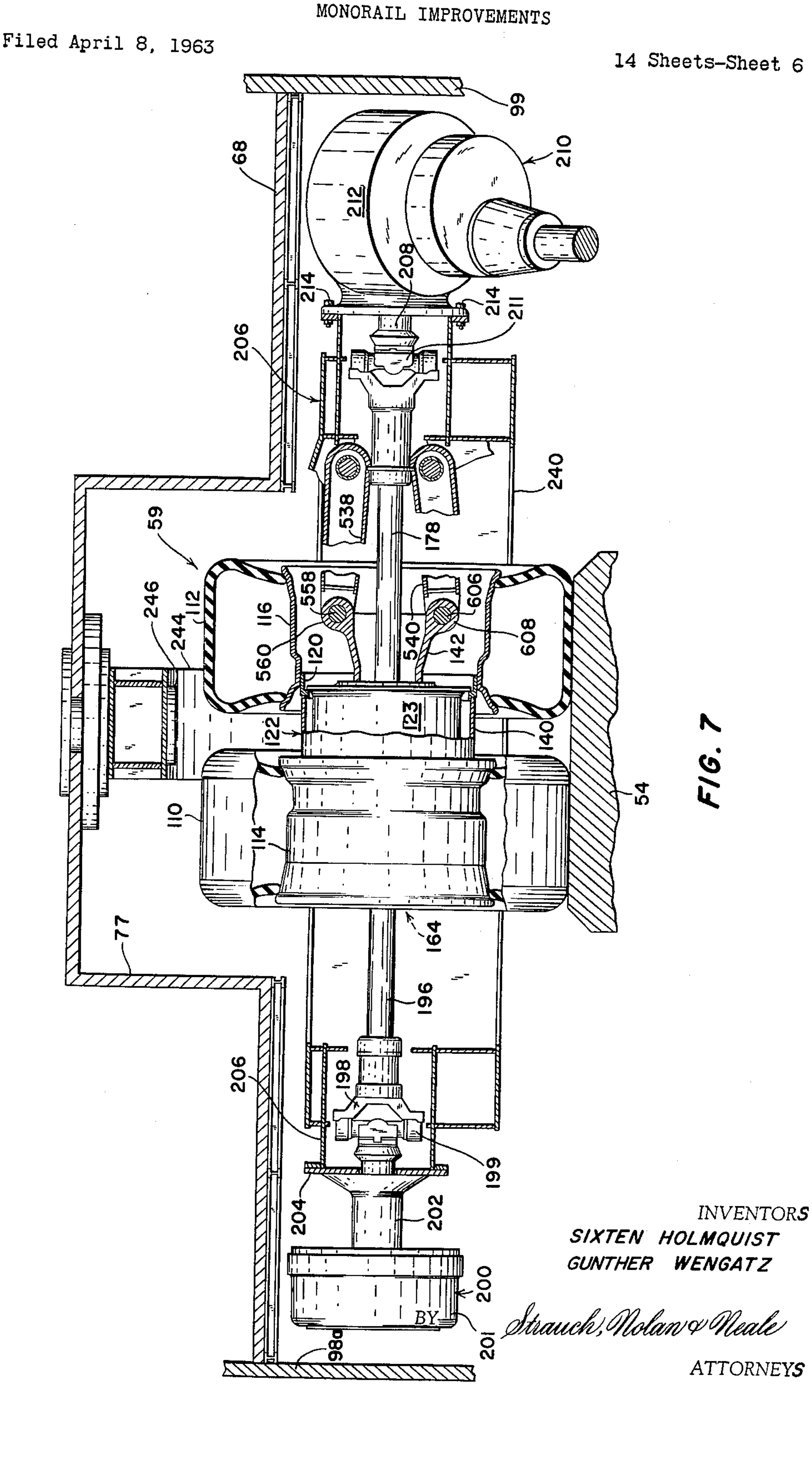
FIGURE 7 is an enlarged fragmentary sectional view taken substantially along lines 7—7 of FIGURE 4 and illustrating the axle drive unit and load carrying wheel assembly.
Figure 8:
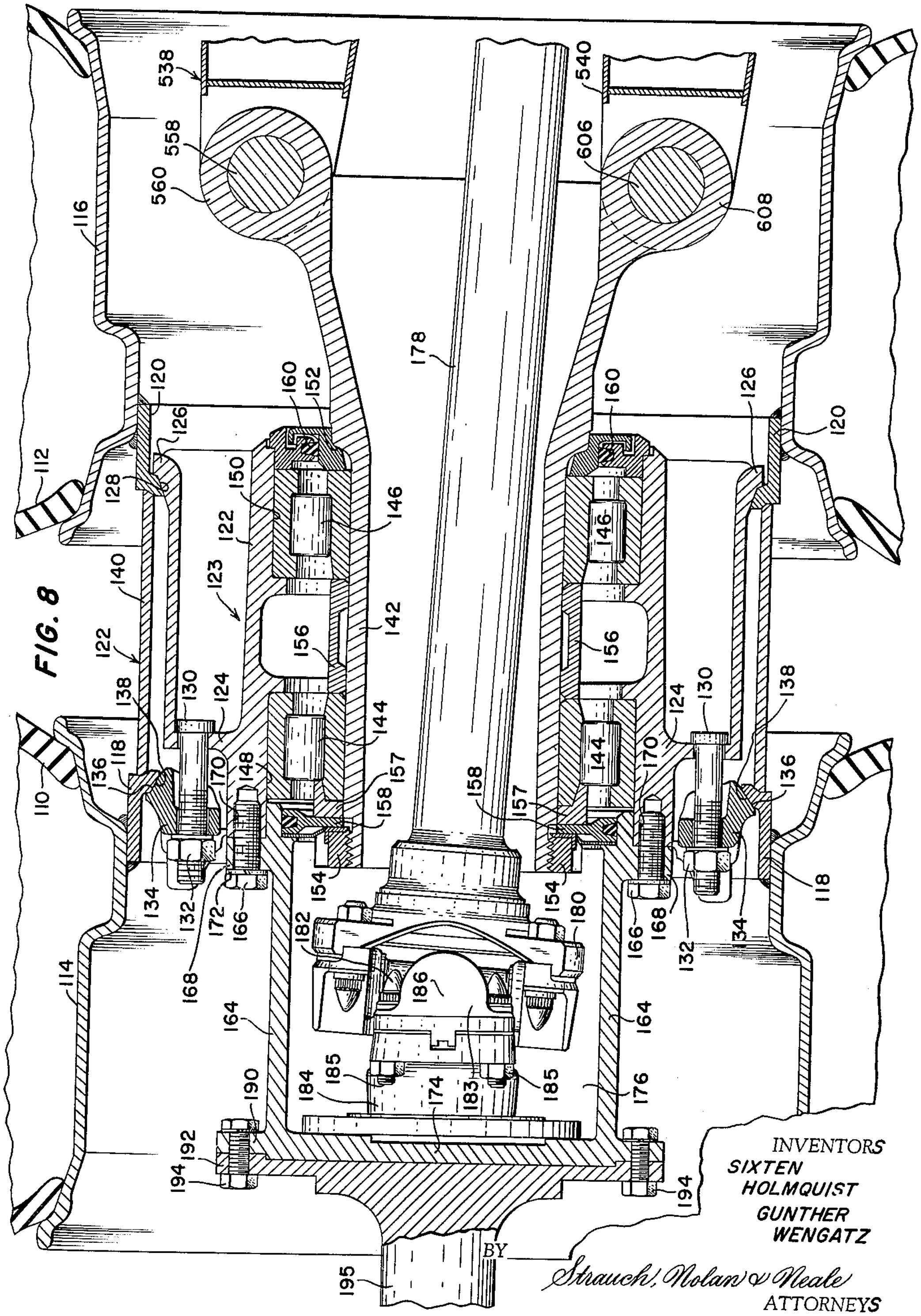
FIGURE 8 is an enlarged fragmentary sectional view taken along lines 8—8 of FIGURE 4 and illustrating interior components of the axle drive unit on a larger scale and in greater detail than in FIGURE 7.

Thus, with reference to FIGURES 3, 4, 7 and 8 and particularly to FIGURES 7 and 8, the dual wheel assembly 59 of bogie 57 comprises a pair of side-by-side pneumatic type tires 110 and 112 respectively mounted on coaxially spaced apart tire rims 114 and 116 and engaging the top running surface of monobeam 54 which is substantially flat and contained in a plane which usually extends essentially normal to the oppositely facing side surfaces of the beam. Hub adapter rings 118 and 120 respectively fixed, as by welding, to rims 114 and 116, extend coaxially inwardly toward each other in coaxial relationship and mount rims 114 and 116 on a cylindrical wheel hub 122 of a novel drive axle unit 123 in a manner as will now be described.

The tire mounting sub-assemblies formed by rim 114 with ring 118 and by rim 116 with ring 120, as best seen from FIGURE 8, are interchangeably identical in construction and are turned such that they are facing each other in mirror image relationship. Hub 122 is integrally provided with an outwardly extending bolt and clamping flange 124 (FIGURE 8) terminating in a radially extending clamping lip 126 which is adapted to interfittingly grip a mating inwardly turned rim flange 128 integral with ring 120.

With continued reference to FIGURE 8, a series of special circumferentially spaced apart clamping bolts 130 extend through apertures in flange 124 and mount a clamping rim 134 which is retained in place by nuts 132 threaded on to the ends of bolts 130. Rim 134 is provided with an inwardly facing clamping lip 136 matingly engaging a rim clamping flange 138 formed on ring 118. A rigid annular spacer 140 is interposed axially between rings 118 and 120 in concentric surrounding relationship to hub 122. By tightening nuts 132, lips 126 and 136 are drawn tightly against flanges 128 and 138 respectively to secure rims 114 and 116 and spacer 140 together as a unit on hub 122.

Hub 122 is coaxially journalled on a non-rotatable tubular spindle or axle support housing 142 by a pair of axially spaced anti-friction roller bearings 144 and 146 respectively having their outer races pressed tightly into recessed cylindrical hub seats 148 and 150. Bearings 144 and 146 are axially interposed between an annular shoulder 152 on axle housing 142 and a bearing load adjusting nut 154 threaded on to the outer end of the axle housing. Interposed between bearings 144 and 146 is a spacer ring 156 which is mounted on axle housing 142 in snug abutment with the inner races of bearings 144 and 146. Bearing 144 is axially retained in place between spacer ring 156 and an annular retainer 157. An annular O-ring seal mounting plate 158 is axially interposed and clamped in place between nut 154 and retainer 157. Bearing 146 is axially retained in place between spacer ring 156 and an oil seal assembly 160 which is held in snug abutment with shoulder 152 by tightening nut 154. Nut 154 may be axially advanced in opposite directions on the threaded end of axle housing 142 to adjust the preloading of bearings 144 and 146.

With continuing reference to FIGURE 8, a cylindrical hub cap coupling member 164 is coaxially fixed to the rotatable hub 122 as by cap screws 166 extending through a radial flange 168 formed integral with cap member 164 and threaded into tapped holes 170 formed inwardly of an outer flat end face 172 on hub 122. Cap member 164 is formed with a hollow interior and is closed at its outer end by a transverse flat end wall 174 to provide a recess 176 which opens axially inwardly toward the outer threaded end of axle housing 142.

With continued reference to FIGURE 8, cap member 164 provides the drive connection between hub 122 and a rotatable drive axle shaft 178 extending through and projecting axially beyond axle housing 142 at both ends thereof. Axle shaft 178 extends into recess 176 and is drivingly connected by means of a coupling flange assembly 180 to a suitable universal joint 182 disposed completely within recess 176 and connected to a stub shaft element 184 by stud and nut assemblies 185. Shaft element 184 is rigidly fixed to end wall 174 so that hub 122 and cap member 164 will be rotated as unit by axle shaft 178.

With the dual wheel assembly and drive axle structure thus far described, it is clear that axle shaft 178 is universally articulated about a point indicated at 186 which is within recess 176. This structure, as will become apparent as the description proceeds, enables the body of car 50 to ride vertically up and down with respect to axle housing 142, the axis of which is maintained at a substantially fixed distance above and in parallel relation to the top surface of monobeam 54 by wheel assembly 59. The load line representing the concentration of the load carried by wheel assembly 59 normally intersects the rotational axis of the wheel assembly and the top wheel engaging surface of monobeam 54 and extends midway between rims 114 and 116.

With continued reference to FIGURE 8, cap member 164 is provided with a coupling flange 190 radially projecting from end wall 174. A mating flange 192 securely coupled to flange 190 as by bolt and nut assemblies 194 is formed integral with a stub shaft 195 which is drive connected to a short brake shaft 196 (FIGURE 7) by a universal joint and coupling flange assembly 198 (FIGURE 7). Brake shaft 196, as shown in FIGURE 7, extends axially to the left of cap member 164 and is connected by a universal joint 199 to a suitable brake mechanism 200. Brake mechanism 200 is provided with a housing 201 having a tubular extension 202 terminating in a flange 204 which is securely mounted on the side of a rigid truck frame 206 of bogie assembly 57. Preferably, brake mechanism 200 is of the type which automatically energizes in the event of failure of the actuating fluid (hydraulic or pneumatic) pressure. Fawick Patent No. 2,726,738 issued December 13, 1955, for Hydraulic and Vacuum Generated Brakes is a typical suitable brake system.

As best shown in FIGURE 7, the end of axle shaft 178 opposite from cap member 164 is coupled to an output shaft 208 of a differential gear carrier 210 preferably by a spline connection and universal joint and coupling flange assembly 211. Carrier 210 comprises a housing 212 internally supporting a suitable hypoid or bevel gear reduction mechanism (not shown) and being securely mounted as by nut and bolt assemblies 214 on truck frame 206 on the side thereof opposite from brake mechanism 200.

Figure 4:
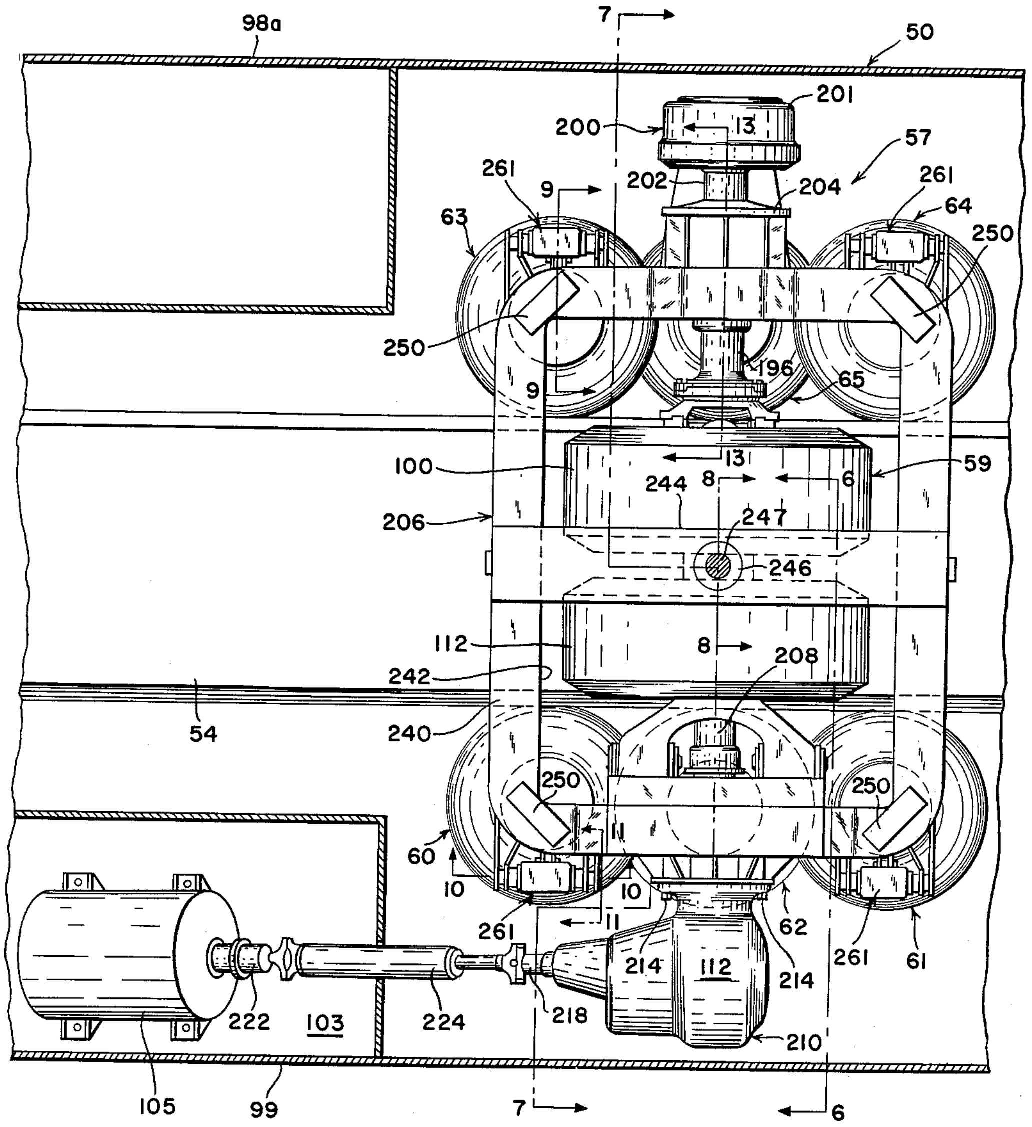
FIGURE 4 is an enlarged fragmentary plan view of the forward bogie assembly illustrated in FIGURE 3.
Figure 5:
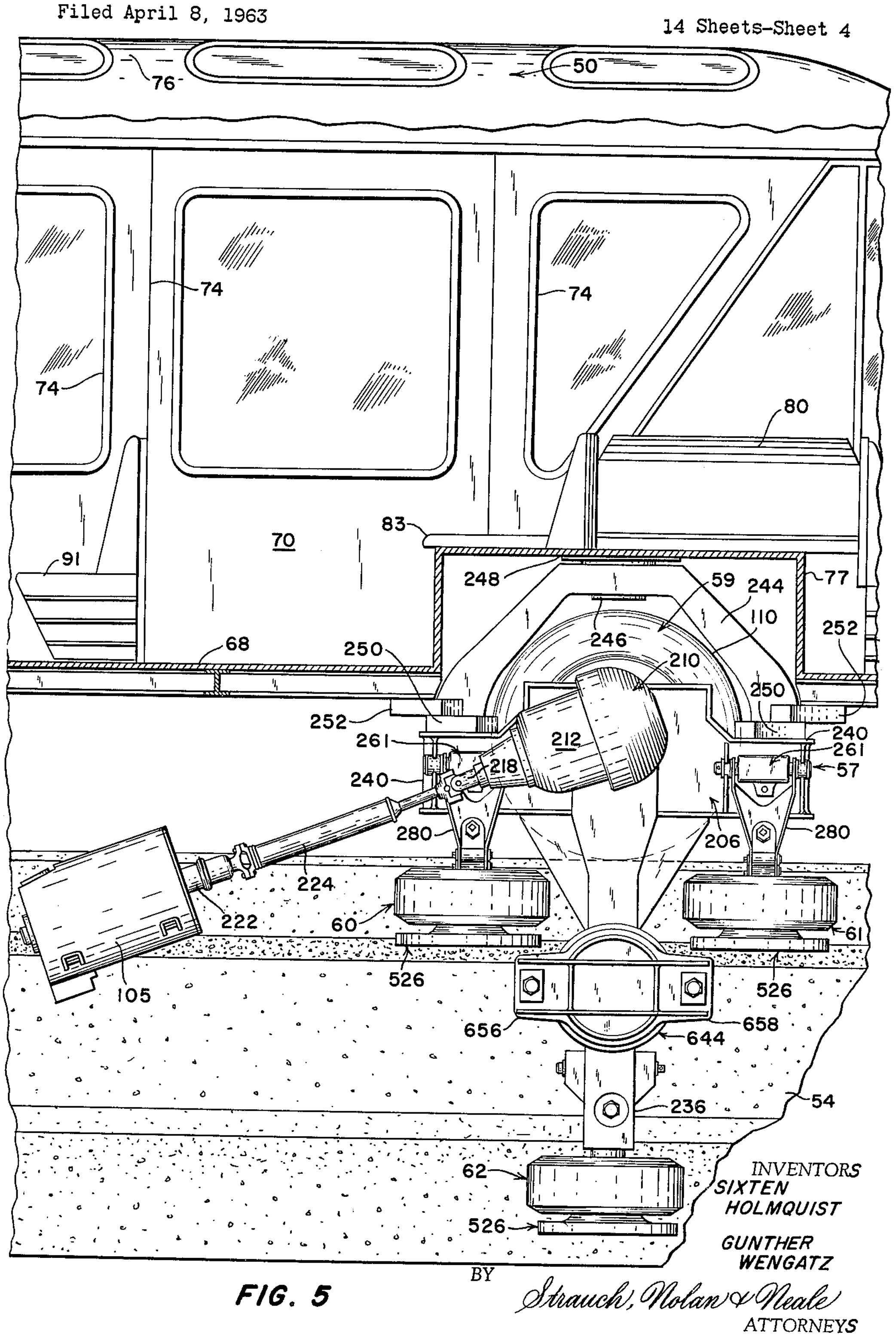
FIGURE 5 is an enlarged fragmentary view of the forward bogie assembly illustrated in FIGURE 1.

With reference now to FIGURES 3–5, carrier 210 is provided with an input shaft 218 journalled in housing 212 for rotation about an axis which is normal to the rotational axis of output shaft 208 and inclined downwardly and rearwardly in the direction of motor compartment 103 which is disposed rearwardly of carrier 210. A shaft 222 driven by motor 105 in compartment 103 is rotatable about an axis extending parallel to the longitudinal center line of car 50 and is drive connected to the carrier input shaft 218 by a suitable universally connected telescoping propeller shaft 224.

From the foregoing, it will be appreciated that the drive connection established between motor 104 and wheel hub 122 contains only a single right angular bend enabling motor 105 to be positioned below the axis of axle housing 142 between skirt 99 and the opposed side surface of monobeam 54. By utilizing carrier 210 to provide the connection between the mutually perpendicular axes of propeller shaft 224 and axle shaft 178, the number of couplings and universal joints are minimized in the drive connection formed by propeller shaft 224, carrier 210 and axle shaft 178. It is also clear that by mounting carrier 210 at one end of axle shaft 178 and brake mechanism 200 at the opposite end of shaft 178 with wheel assembly 59 interposed axially between carrier 210 and brake mechanism 200, a compact and simplified drive axle unit is obtained. The construction of motor 104 and bogie assembly 58 is the same as that of motor 105 and bogie assembly 57 as previously mentioned but with the drive unit comprising motor 104 and bogie assembly 58 being horizontally turned 180 degrees relative to motor 105 and assembly 57 so that carrier 210 of assembly 58 is on the opposite side of car 50 and adjacent skirt 98*a*.

With continued reference to FIGURES 3–5, truck frame 206 is spring suspended on axle housing 142 by means to be presently described and pivotally supports the forward end of car 50 on monobeam 54. Truck frame 206 is a generally inverted U-shaped all welded skeleton frame structure straddling monobeam 54 and formed by parallel depending bracket arms 236 (FIGURE 5) and 238 (FIGURE 13) extending downwardly along opposite sides of beam 54 and rigidly joined together by a cross piece 240 (FIGURE 4) horizontally interposed between car floor 68 and the top surface of beam 54. Cross piece 240 is of hollowed frame-like configuration having a central generally rectangular bordered opening 242 (FIGURE 4) through which tires 110 and 112 of wheel assembly 59 project. Wheel assembly 59, as best seen from FIGURE 7, is thus encircled by cross piece 240 in the vicinity of its rotational axis.

As shown in FIGURES 4 and 5, truck frame 206 is provided with an upwardly bowed member 244 extending over wheel assembly 59 midway between tires 110 and 112 and fixedly joined at its opposite ends to forward and rearward sides of cross piece 240 in bridging relationship to opening 242 and at right angles to the axis of axle housing 142. The topmost center portion of member 244 is flattened and disposed adjacent to the downwardly facing surface of the top wall of housing 77. Fixedly mounted in a socket formed in the topmost portion of bridging member 244 is a pivot bearing sleeve 246 having its longitudinal axis in alignment with the medial load line and normally intersecting the axis of axle housing 142 midway between tires 110 and 112. Bearing sleeve 246 is adapted to rotatably receive a depending pivot post connector 247 (FIGURE 4) which may be carried by a pivot load bearing plate assembly 248 (FIGURE 5) secured to housing 77 vertically above sleeve 246. The axis of connector 247 normally intersects the longitudinal center line of car 50 so that bogie assembly 57 is pivotable relative to the body of car 50 about an axis normally intersecting the center line of car 50 and the rotational axis of wheel assembly 59. Bearing sleeve 246 and connector 247 constitute the sole pivot connection between the body of car 50 and bogie assembly 57.

By pivoting bogie assembly 57 about an axis normally intersecting the longitudinal center line of car 50 and the axis of axle housing 142 midway between tires 110 and 112, destructive tire drag is minimized since the radius about which tires 110 and 112 will pivot is very small, being not more than one-half the axial length of wheel assembly 59. Consequently, tire wear resulting from pivotal movement of bogie assembly 57 relative to car 50 is maintained at an absolute minimum. In addition, tires 110 and 112 are of specially designed wide tread and have sufficient axial flexibility to permit axial displacement of the axle relative to the tire treads, thus permitting wheel assembly 59 to round curves in monobeam 54 of a radius of the order of as low as 600 feet without material wear producing side slippage of the tire treads with respect to the top surface of beam 54.

As best shown in FIGURE 4, four bearing pads 250 are mounted one at each of the four corners of the rectangular cross piece 240 and matingly engage with complemental pads 252 (FIGURE 5) fixed on the body of car 50 to provide preferably lateral and vertical support on bogie frame 206 and also to provide for relative steering rotation of the bogie with respect to the car body on curves.

With continued reference to FIGURES 4 and 5, truck frame 206 carries the side guide and stabilizing wheels 60–65 which guide and stabilize car 50 in central relation on monobeam 54. As viewed from FIGURE 4, wheels 60–62 are disposed at one side of monobeam 54 and wheels 63–65 are disposed on the opposite side of the beam. The steered position of frame 206, as will presently become apparent, is controlled by side guide wheels 60–65 in rolling engagement with the sides of monobeam 54.

As best seen from FIGURE 4, side guide wheels 60 and 61 are respectively equidistantly and symmetrically located rearwardly and forwardly of the rotational axis of the load carrying wheel assembly 59. Wheel 62 is located midway between and below wheels 60 and 61 so that the rotational axis of wheel 62 intersects the axis of wheel assembly 59. Wheels 63, 64 and 65 on the opposite side of beam 54 are respectively disposed in mirror image relationship to wheels 60, 61 and 62. In a manner to be presently described in detail, each of the wheel assemblies 60–65 is individually suspended from frame 206 and is independently biased into engagement with monobeam 54 for stabilizing car 50 in centered relation on beam 54 in opposition to forces tending to tilt or laterally shift the car.

In accordance with the present invention, wheels 60, 61, 63 and 64 are identically constructed and are individually suspended from frame 206 by indentically constructed force transmitting linkage assemblies each containing a wheel contact torsion spring assembly 261. Accordingly, only wheel 60 together with its associated linkage and torsion spring assembly 261 will be described in detail with like reference numerals designating like parts for wheels 61, 63 and 64.

Figure 9:
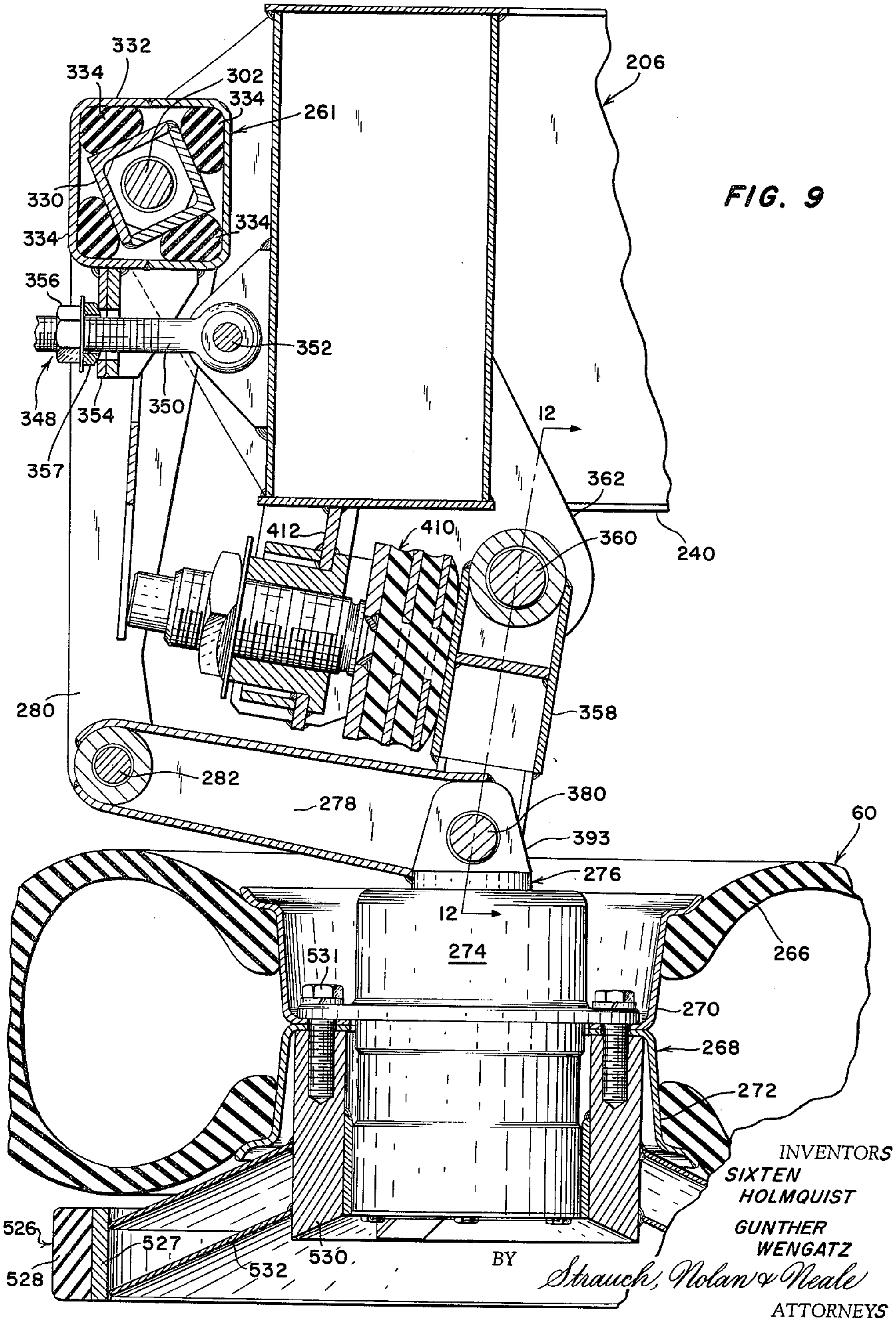
FIGURE 9 is an enlarged fragmentary sectional view taken substantially along lines 9—9 of FIGURE 4 and illustrating details of one of the upper side guide wheels and the linkage suspension therefor.

Thus, with reference now to FIGURE 9, wheel 60 comprises a pneumatic type tire 266 mounted on a wheel rim 268 comprising a pair of annular disk-shaped rim members 270 and 272 securely fixed together in coaxial back-to-back relation and mounted on a hub 274 for rotation therewith. Hub 274 is journalled on a downwardly depending axle spindle 276 which is fixed, as by welding, at its upper end to a rigid spindle arm 278. Arm 278 extends laterally outwardly from the axis of spindle 276 above wheel 60 and is pivotally connected at its outer end to the lower end of an upstanding link 280 by means of a cylindrical pivot pin 282 carried by link 280.

Figure 10:
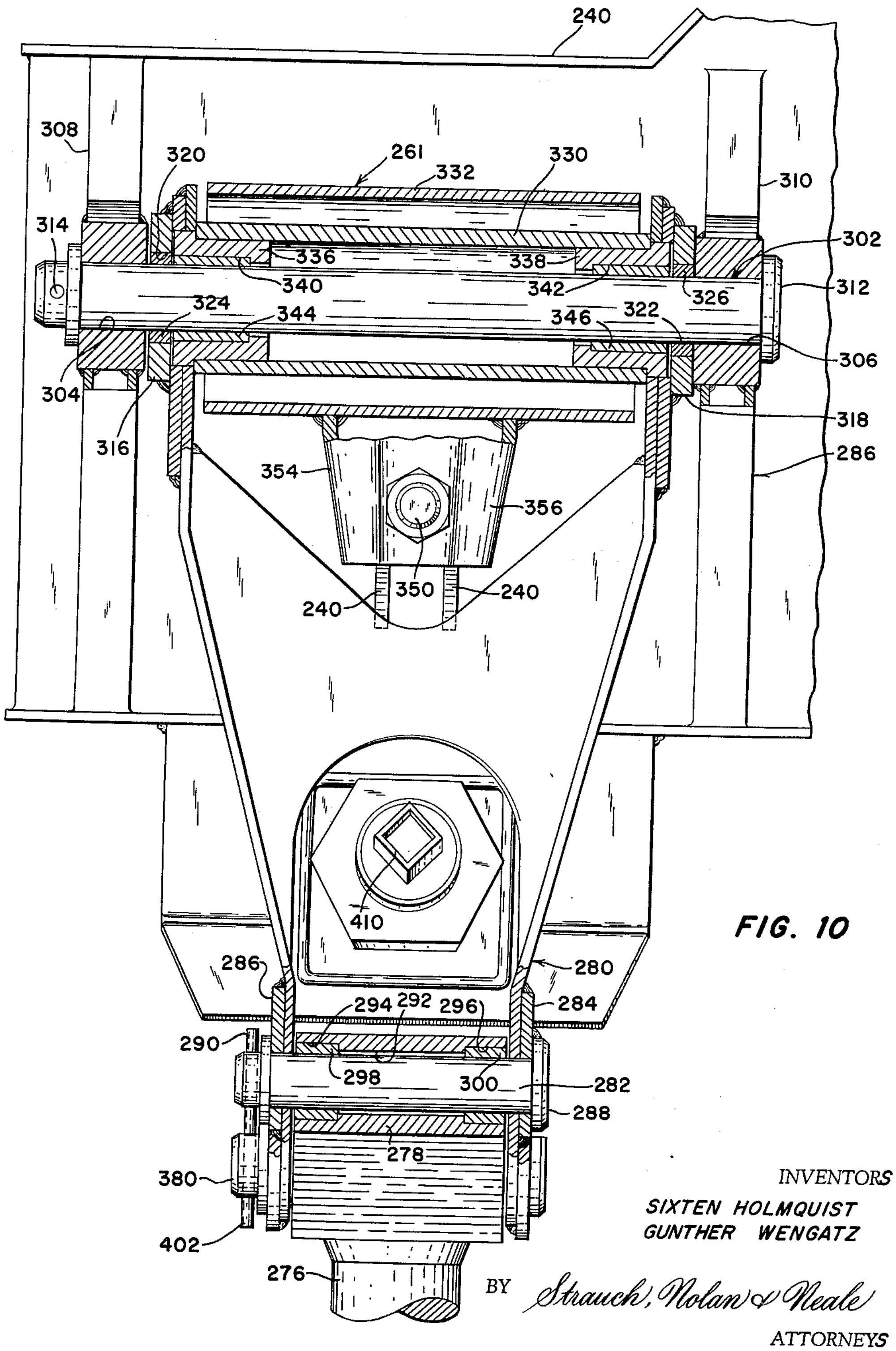
FIGURE 10 is an enlarged fragmentary sectional view taken substantially along lines 10—10 of FIGURE 4.

As best shown in FIGURE 10, link 280 is formed at its lower end with parallel spaced apart arms 284 and 286 comprising flat sided rigid plate sections and having axially aligned apertures interfittingly receiving pin 282. Pin 282 terminates at its right-hand end axially beyond arm 284 in enlarged head 288 abutting the outwardly facing flat surface of arm 284. The opposite end of pin 282 mounted a small retainer pin 290 axially outwardly of arm 286 and extending transversely of the axis of pin 282. Pin 290 protrudes at both ends beyond the cylindrical periphery of pin 282 and cooperates with head 288 to axially retain pivot pin 282 in place on link 280.

With continued reference to FIGURE 10, the outer end of arm 278 projects between arms 284 and 286 and is formed with a smooth cylindrical through bore 292 and coaxial counterbores 294 and 296 freely receiving the intermediate portion of pin 282 bridging arms 284 and 286. Counterbores 294 and 296 respectively receive axially spaced apart sleeve bearings 298 and 300 mounted on pin 282 and journalling arm 278 for rocking movement about the axis of pin 282.

Figures 11, 13:
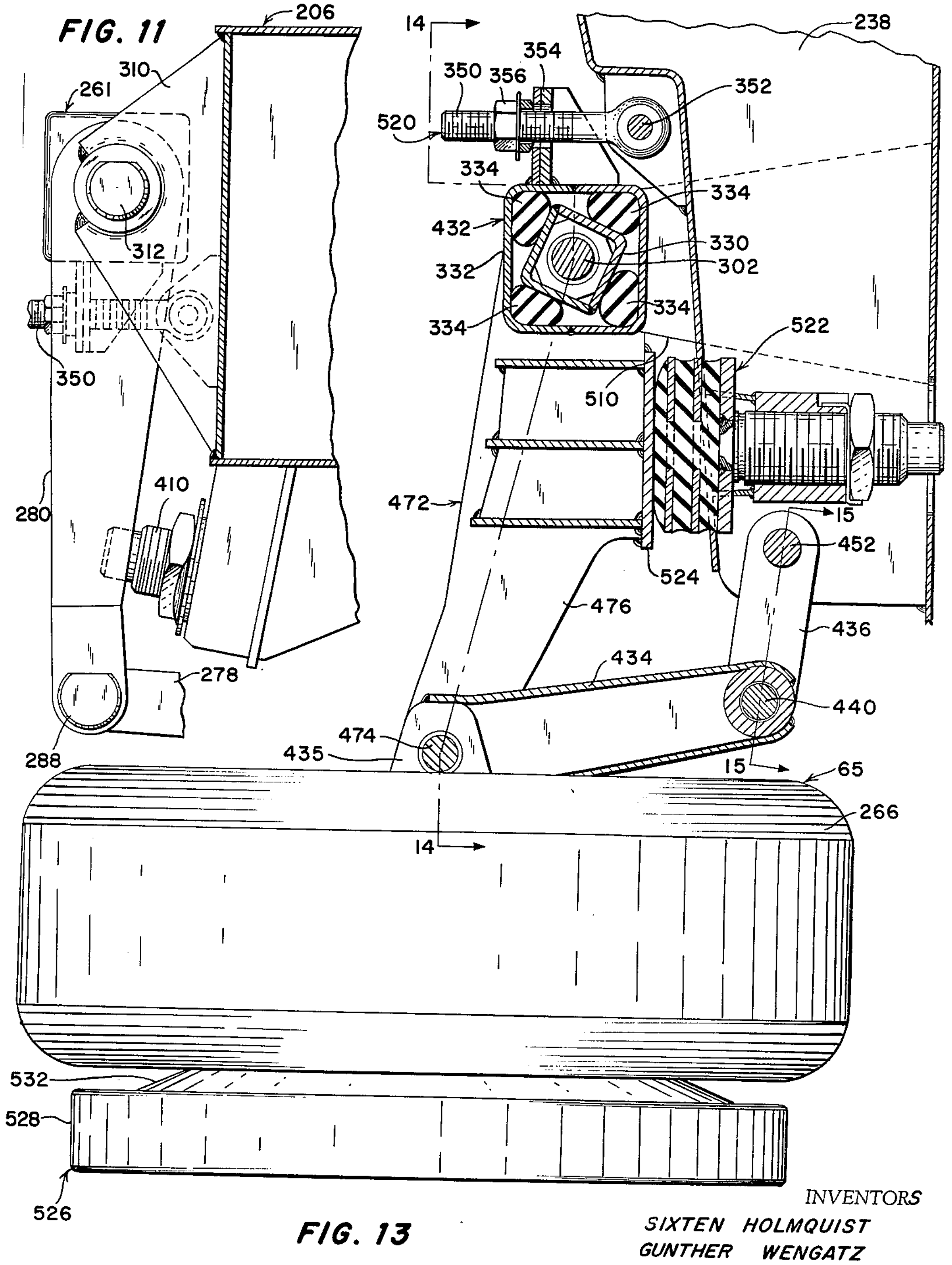
FIGURE 11 is an enlarged fragmentary sectional view taken substantially along lines 11—11 of FIGURE 4.
FIGURE 13 is an enlarged fragmentary sectional view taken substantially along lines 13—13 of FIGURE 4 and illustrating details of one of the lower side guide wheels and the linkage suspension therefore.

With continued reference to FIGURES 9–11, link 280 is pivotally connected at its upper end to cross-piece 240 of bogie frame 205 by means of a cylindrical journal pin 302. Pin 302 interfittingly extends through axially aligned smooth cylindrical bores 304 and 306 respectively formed in parallel spaced apart support brackets 308 and 310 (FIGURE 11) fixed, as by welding, to cross-piece 240 and projecting outwardly therefrom. Pin 302 is formed at its right-hand end with an enlarged head 312 axially outwardly of bracket 310. The opposite end of pin 302 mounts a small cylindrical retainer pin 314 axially outwardly of bracket 308 and extending perpendicularly through pin 302. Pin 314 protrudes at opposite ends beyond the periphery of pin 302 and cooperates with head 312 for axially retaining pin 302 in place on brackets 308 and 310.

The upper end of link 280, as best seen from FIGURE 10, is formed with parallel spaced apart arms 316 and 318 built up from overlapping welded flat sided plate sections and respectively having axially aligned smooth cylindrical bores 320 and 322 coaxially receiving axially spaced apart sleeve bushings 324 and 326 of bearing material.

Bushings 324 and 326 are mounted on pin 302 in bores 320 and 322 respectively to journal link 280 adjacent its upper end for rocking movement about the axis of pin 302. The axis of pin 302 is parallel to the axis of pin 282 and is disposed laterally outwardly from the axis of spindle 276 when wheel 60 is in engagement with the side of monobeam 54.

With continuing reference to FIGURES 9 and 10, torsion spring assembly 261 is supported on pin 302 between arms 316 and 318 and is operatively connected between frame 206 and link 280 to yieldably resist the turning effect on link 280. Torsion spring assembly 261 preferably is the known Neidhard rubber torsion bus spring unit manufactured by the Goodyear Tire and Rubber Company and comprises an open-ended inner rigid shell 330 and an open ended outer rigid shell 332 surrounding inner shell 330 in spaced apart relationship thereto. Shells 330 and 332 are formed with similar cross-sections of essentially square configuration with inner shell 330 being turned slightly such that the corners of shell 330 are in regions located between the corners of shell 332. Shell 332 is supported on shell 330 by at least one set of four resilient cushion elements 334 each made of elastic rubber or equivalent tough flexible and elastic material. Elements 334 are compressed between shells 330 and 332 at the four corners of shell 332 and function to resiliently resist relative axial rotation between shells 330 and 332 about the axis of pin 302.

Inner shell 330 is mounted on pin 302 by a pair of members 336 and 338 disposed within the interior of shell 330 and secured thereto. Members 336 and 338 are respectively formed with stepped cylindrical bores 340 and 342 through which pin 302 freely extends. Bores 340 and 342 provide shouldered cylindrical recesses respectively receiving axially spaced apart sleeve bearings 344 and 346 mounted on pin 302 and journalling inner shell 330.

With continued reference to FIGURES 9 and 10, inner shell 330 is fixed to arms 316 and 318 of link 280 and outer shell 332 is operatively connected to frame 206 by a pre-loading assembly 348 which provides selective variation of preload. Pre-loading assembly 348 comprises an eyebolt 350 pivotally secured to cross piece 240 as by a pin 352 and extending freely through a depending plate 354 fixed to outer shell 330 as by welding. The axis of pin 352 is parallel to the axis of pin member 302. A load adjusting nut 356 is threaded on the end of eyebolt 350 projecting beyond plate 354 and axially outwardly of an annular stop member 357 slidably mounted on eyebolt 350 for engagement with the outwardly facing surface of plate 354.

By threadedly advancing nut 356 inwardly to adjust the angularity of outer shell 332 relative to inner shell 330, inner shell 330 of torsion spring assembly 261 is pre-loaded so that it is under predetermined torsion. As a result, torsion spring assembly 261 provides a biasing force which is transmitted through link 280 and spindle arm 278 to urge wheel 60 into engagement with the side surface of monobeam 54 and to absorb wheel thrust against beam 54.

Figures 12, 14, 15:
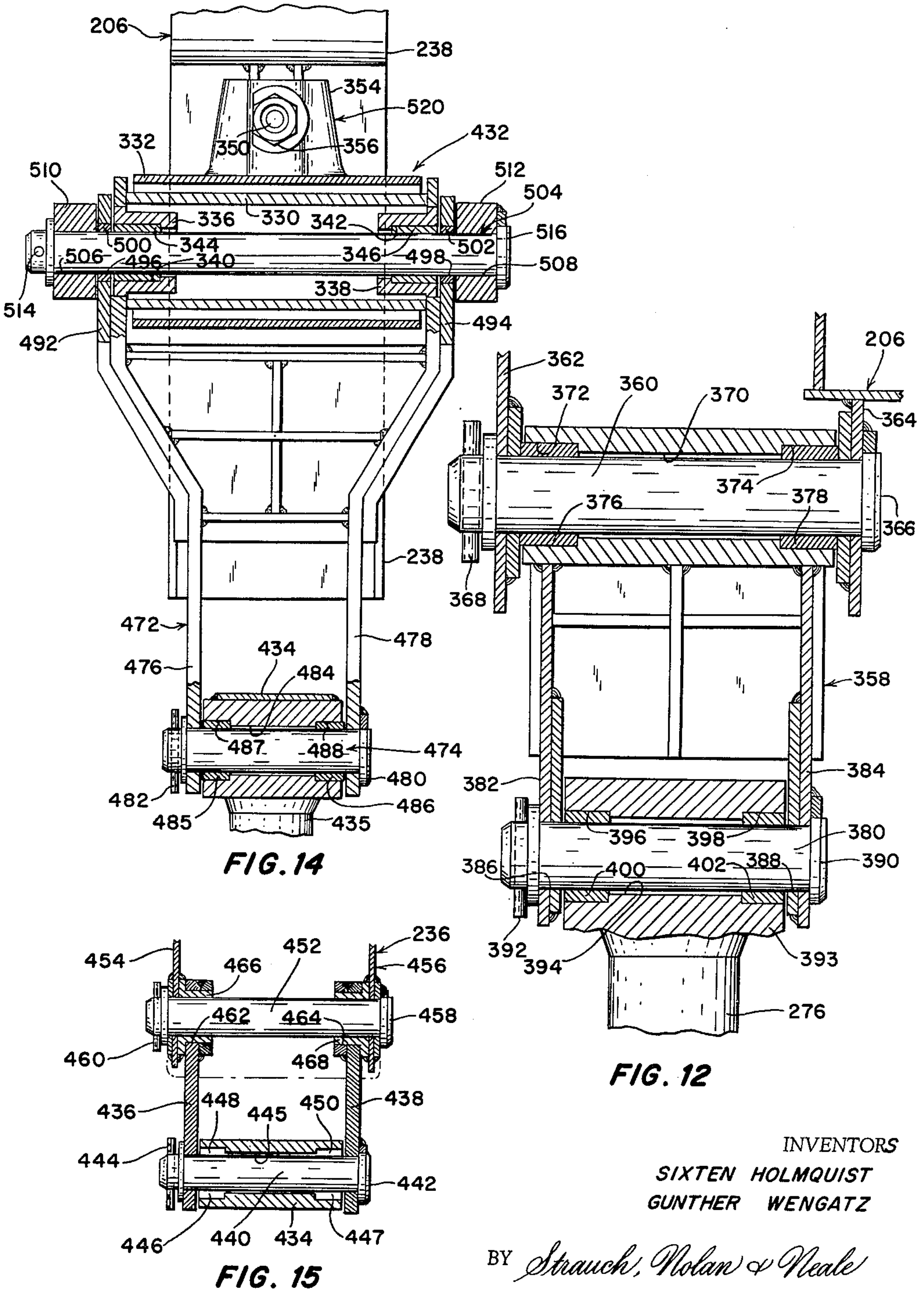
FIGURE 12 is a fragmentary sectional view taken substantially along lines 12—12 of FIGURE 9.
FIGURE 14 is a section taken substantially along lines 14—14 of FIGURE 13.
FIGURE 15 is a section taken substantially along lines 15—15 of FIGURE 13.

With reference now to FIGURES 9 and 12, the linkage suspending wheel 60 further comprises a link 358 pivotally connected to frame 206 by means of cyclindrical pin 360 which is mounted by fixed brackets 362 and 364 along an axis parallel to and inwardly of the axes of pins 282 and 302 and in a region located approximately vertically above spindle 276. Brackets 362 and 364 are provided with aligned apertures through which pin 360 extends. As viewed from FIGURE 12, the right-hand end of pin 360 is provided with an enlarged head 366 axially outwardly of bracket 364. The opposite end of pin 360 mounts a small retainer pin 368 axially outwardly of bracket 362 and extending perpendicularly through pin 360. Pin 368 protrudes at both ends beyond the cylindrical periphery of pin 360 and cooperates with head 366 to axially retain pin 360 in place on brackets 362 and 364.

As best shown in FIGURE 12, link 358 extends between brackets 362 and 364 and is formed with a smooth cylindrical through bore 370 and coaxial counterbores 372 and 374 receiving the intermediate portion of pin 360 bridging brackets 362 and 364. Counterbores 372 and 374 respectively receive axially spaced apart sleeve bearings 376 and 378 journalling link 358 on pin 360. Link 358 depends from pin 360 and is pivotally connected at its lower end to spindle 276 as by a cylindrical pin 380 carried by link 358 along an axis which is parallel to that of pin 360 in a manner now to be described.

Link 358 is formed with depending parallel spaced apart arms 382 and 384 built up from overlapping welded plate sections and having coaxially aligned bores 386 and 388 which receive the opposite end regions of pin 380. As viewed from FIGURE 12, the right-hand end of pin 380 is provided with an enlarged head 390 axially outwardly of arm 384. The opposite end of pin 380 mounts a small retainer pin 392 axially outwardly of arm 382. Pin 392 extends transversely through pin 380 and protrudes beyond the periphery thereof so as to provide an interlock with head 390 axially retaining pin 380 in place on arms 382 and 384.

With continued reference to FIGURE 12, spindle 276 has an end boss portion 393 formed with a smooth cylindrical through bore 394 and coaxial counterbores 396 and 398 extending along a common axis normally intersecting the spindle longitudinal axis and freely receiving the intermediate portion of pin 380 bridging arms 382 and 384. Counterbores 396 and 398 respectively receive sleeve bearings 400 and 402 mounted on pin 380 and journalling spindle 276 for swinging movement about the axis of pin 380.

Links 280 and 358 cooperate with arm 278 and frame 206 to form a parallelogram maintaining the axis of spindle 276 substantially normal to the axis of pin 302 in parallel relation to the side wheel engaging surface of beam 54, but permitting wheel 60 to swing laterally relative to frame 206 when frame 206 is tilted to one side or the other or when the width of monobeam 54 is varied.

With continued reference to FIGURE 9, a main lateral rubber spring 410 essentially in the form of a block is operatively interposed between link 358 and the cross piece 240 of frame 206. One end of rubber spring 410 is connected to a bracket 412 fixed to frame 206 as by welding. The opposite end of rubber spring 410 is connected to link 358 to thus cushion clockwise pivotal movement of wheel 60 about the axis of pivot pin 302. Rubber spring 410 thus absorbs the force transmitted from wheel 60 to bracket 412 to assist in the stabilization of car 50 and in the absorption of wheel thrust.

The foregoing linkage, wheel contact spring and main rubber spring construction for suspending wheel 60 as previously mentioned is the same as that for suspending wheels 61, 63 and 64 on frame 206 with like reference numerals identifying like parts. The axes of pins 302 in the linkages suspending wheels 60 and 61 are coaxially aligned. Similarly, the axes of pins 302 in the linkages suspending wheels 63 and 64 are coaxially aligned and in parallel relation with pins 302 associated with wheels 60 and 61.

Referring now to FIGURE 13, the lower wheels 62 and 65 are of the same construction as wheels 60, 61, 63 and 64 previously described with like reference numerals designating like parts. Individually suspending wheels 62 and 65 from frame 206 are identically constructed linkage assemblies each containing a torsion spring assembly 432. Since these linkage assemblies are the same for wheels 62 and 65 only one such linkage assembly together with its associated torsion spring assembly 432 will be described with respect to wheel 65 with like reference numerals designating like parts in the linkage assembly mounting wheel 62.

Accordingly, a rigid spindle arm 434 as best shown in FIGURE 13, is fixed, as by welding, to the upper end of a wheel spindle 435 rotatably mounting wheel 65. Arm 434 extends laterally outwardly from spindle 435 and is pivotally connected to a pair of parallel upstanding links 436 and 438 by means of a cylindrical pin 440 extending along an axis which is perpendicular to the axis of spindle 435.

With reference now to FIGURES 13 and 15, links 436 and 438 are secured together as a unit and are formed at their lower ends with coaxially aligned apertures through which pin 440 extends. Pin 440 terminates in an enlarged head 442 disposed axially outwardly of link 438. A small retainer pin 444 extends transversely through the opposite end of pin 440 axially outwardly of link 436 and protrudes at both ends to cooperate with head 442 for axially retaining pin 440 in place on links 436 and 438. The outer end of arm 434 extends between links 436 and 438 and is formed with a bore 445 and coaxial counterbores 446 and 447 freely receiving the intermediate portion of pin 440 bridging links 436 and 438. Counterbores 446 and 447 respectfully receive axially spaced apart sleeve bearings 448 and 450 mounted on pin 440 and journalling arm 434 about the axis of pin 440. Link 436 is axially retained in position between pin 444 and link 438. Link 438 is axially retained in position in spaced apart relation to link 436 between head 442 and link 436.

With continuing reference to FIGURES 13 and 15, links 436 and 438 are pivotally suspended as a unit from frame 206 by means of a cylindrical pin 452 extending in parallel relation to pin 440 through coaxially aligned apertures formed in spaced apart plate sections 454 and 456 of frame arm 238. Pin 452 is essentially of the same construction as pin 440, having an enlarged head 458 axially outwardly of plate section 456 and mounting a protruding retainer pin 460 axially outwardly of plate section 454. Pin 460 cooperates with head 458 to retain pin 452 in place on frame arm 238. Links 436 and 438 extend between plate sections 454 and 456 and have axially aligned bores 462 and 464 through which pin 452 freely extends. Received in bores 462 and 464 respectively are sleeve bearings 466 and 468 journalling links 436 and 438 on pin 452.

With reference now to FIGURES 13 and 14, the linkage suspending wheel 65 further comprises an upstanding link 472 pivotally connected by means of a cylindrical pin 474 to the upper end of spindle 435. The lower end of link 472 is bifurcated to provide depending parallel spaced apart arms 476 and 478 having aligned apertures through which pin 474 interfittingly extends in parallel relationship with pins 440 and 452. Pin 474 is formed with an enlarged head 480 axially outwardly of arm 478. At its opposite end, pin 474 mounts a small retainer pin 482 which extends transversely through pin 474 axially outwardly of arm 476. Pin 482 protrudes at both ends to cooperate with head 480 for retaining pin 474 axially in place on link 472.

As best shown in FIGURE 14, spindle 435 extends upwardly between arms 476 and 478. Spindle 435 is formed with a smooth cylindrical through bore 484 and coaxial counterbores 485 and 486 along an axis normally intersecting the spindle longitudinal axis about which wheel 65 is rotatable. Bore 484 receives the intermediate portion of pin 474 bridging arms 476 and 478 with counterbores 485 and 486 receiving axially spaced apart sleeve bearings 487 and 488 mounted on pin 474 and journalling spindle 435 on pin 474.

With continued reference to FIGURES 13 and 14, the upper end of link 472 is also bifurcated to provide parallel spaced apart arms 492 and 494 built up from overlapping welded plate sections. Arms 492 and 494 are provided with aligned bores 496 and 498 respectively receiving sleeve bearings 500 and 502. Sleeve bearings 500 and 502 are mounted on a journal pin 504 extending through bores 496 and 498 in bridging relation to arms 492 and 494 to thus journal link 472 for swinging movement about the longitudinal axis of pin 504.

Pin 504 is of substantially the same construction as pin 302 and has its opposite ends extending axially beyond arms 492 and 494 and received in bores 506 and 508 respectively formed in parallel spaced apart support brackets 510 and 512 fixed to frame 206. A small cylindrical pin 514 extending transversely through the outer left hand end of pin 504 (as viewed from FIGURE 14) protrudes at both ends and cooperates with an enlarged head 516 formed on the right-hand of pin 504 to retain pin 504 axially in place on brackets 510 and 512 in the same manner previously described with respect to pin 302.

Torsion spring assembly 432 is of the same construction as assembly 261 with like reference numerals identifying like parts. Assembly 432 is mounted on pin 504 between arms 492 and 494 in the same manner previously described in connection with torsion spring assembly 261 and pin 302. The inner shell 330 of assembly 432 is operatively connected to arm 472 in the same manner as described in connection with assembly 261. The outer shell 332 of assembly 432 similarly is operatively connected to frame 206 by a pre-loading unit 520 in the same manner as described with respect to the connection of pre-loader 348. The construction of unit 520 is the same as that of pre-loader 348 except that the bracket 354 of unit 520 extends upwardly from outer shell 332 of torsion spring assembly 432. Like reference numerals designate like parts in pre-loading assemblies 520 and 348 respectively.

In the same manner as previously described with respect to spring assembly 261, torsion spring assembly 432 is maintained under predetermined torsion by adjustment of pre-loading unit 520. As a result, guide wheel 65 is biased into engagement with the side surface of monobeam 54. The linkage comprising links 436 and 438 cooperates with the link 472, arm 434 and frame 206 in parallelogram form, permitting wheel 65 to swing about the axis of pin 504 but maintaining the axis of wheel spindle 435 in substantially perpendicular relationship with the axis of pin 504 and also in substantially parallel relation to wheel engaging side surface of monobeam 54 in a manner as will become more apparent as the description proceeds.

To augment the biasing force exerted by torsion spring assembly 432 on guide wheel 65, the main rubber spring 522 is operatively interposed between bogie frame arm 238 and link 472 to bias link 472 in a clockwise direction about the axis of pin 504 as viewed from FIGURE 13. One end of rubber spring 522 is connected to a plate 524 fixed to link 472 and the opposite end of rubber spring 522 is connected to frame arm 238 in any convenient manner.

The foregoing linkage, torsion spring and rubber spring construction for supporting guide wheel 65 from bogie frame 206 is, as previously mentioned, the same for guide wheel 62 with like reference numerals designating like parts and with the components supporting wheel 62 being in mirror image relationship to corresponding components associated with wheel 65.

From the foregoing description of the linkage suspensions for guide wheels 60–65 it is clear that spindles 276 of wheels 60, 61, 63 and 64 and spindles 435 of wheels 62 and 65 are all in parallel relationship with wheels 60–65 being independently swingable about axes mutually parallel with the pivot connection axis of car 50 and bogie frame 206.

With the independent torsion spring suspensions just described for each of the guide and stabilizing wheels 60–65, it will be appreciated that the initial torsion applied to side wheels 60–65 can be independently regulated for each side wheel by adjustment of the four preloading assemblies 348 respectively associated with the upper side wheels 60, 61, 63 and 64 and the two lower side wheel preloading assemblies 520 respectively in conjunction with the main rubber spring. As a result, an increased sensitivity in the control exerted by side wheels 60–65 for guiding and stabilizing car 50 in centered relation to monobeam 54 is achieved. In addition, the reaction of one of the side wheels 60–65 to shock is substantially absorbed by the torsion spring assembly operatively associated therewith and is not transmitted to the remainder of the side wheels or to frame 206. Also, one of the side wheels 60–65 may ride over curved surfaces, imperfections, and variations in beam thickness in monobeam 54 without affecting the beam engaging positions of the other guide wheels.

In summary, each of the side wheel suspensions described above has two operative spring elements: (1) the preloaded torsion spring which assures that its associated side guide wheel will always contact the beam; and (2) the main rubber spring which can also be preloaded and which is operative only for absorbing abnormal lateral forces and for properly steering bogies.

The foregoing independent linkage and torsion spring suspension assembly for each of the side wheels 60–65 also permits the utilization of axially short torsion spring units which are less complicated than relatively long torsion rod arrangements in addition to eliminating complications in the support of the torsion spring assemblies on frame 206.

When car 50 is level on monobeam 54, the parts of bogie assembly 57 are essentially in the positions illustrated with side wheels 60–65 firmly engaging the beam under predetermined torsion. If car 50 should tilt to one side, as the right side, for example, torsion spring assemblies 261 for the upper side wheels 60 and 61 and torsion assembly 432 for the lower side wheel 62 are independently loaded to apply a yieldable force on truck frame 206 to straighten or levelize car 50. In this case the main rubber spring comes into play, straightening or leveling the car in accordance to the selected preload.

Figure 6:
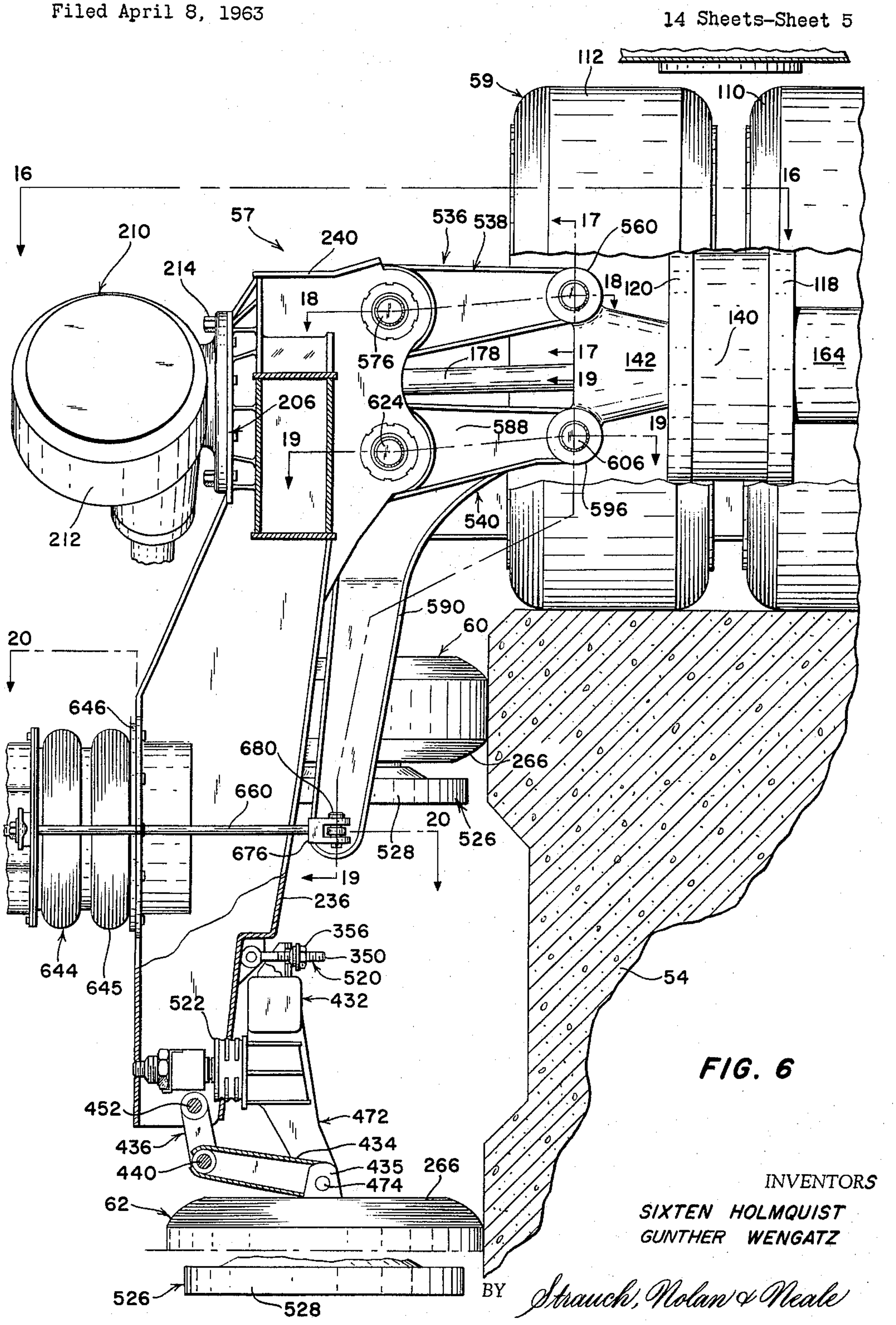
FIGURE 6 is an enlarged fragmentary sectional view taken substantially along lines 6—6 of FIGURE 4.

With continued reference to FIGURES 6, 9 and 13, each of the wheels 60–65 is provided with a safety wheel 526 having a rigid rim 527 and a tough solid rubber annular tire 528 secured to rim 527. Safety wheel 526 is coaxially supported from rim 268 vertically below and closely adjacent to tire 266. Rim 527 is fixed to depending members 530 which are secured as by machine screws 531 to rim members 270 and 272. A rigid reinforcing annulus 532 disposed coaxially with wheel 526 and surrounding hub 274 is fixed to the lower ends of members 530.

The external diameter of tire 528 is appreciably less than the external diameter of tire 266 when the latter is inflated to the proper air pressure. Thus, tire 528 is normally maintained out of engagement with the side wheel engaging surface of monobeam 54 when tire 266 is sufficiently inflated and in engagement with the wheel engaging monobeam side surface. In the event that tire 266 is blown out or goes flat, wheel 526 will engage the side surface of monobeam 54 under the bias exerted by the associated torsion spring assembly 261, 432 for guiding and stabilizing car 50 until repairs can be made and preventing damage to the deflated tire. The independent linkages and torsion spring assemblies suspending guide wheels 60–65 permits safety wheel 526 of one of the guide wheels to engage beam 54 without affecting the position of the remaining guide wheels.

Figure 16:
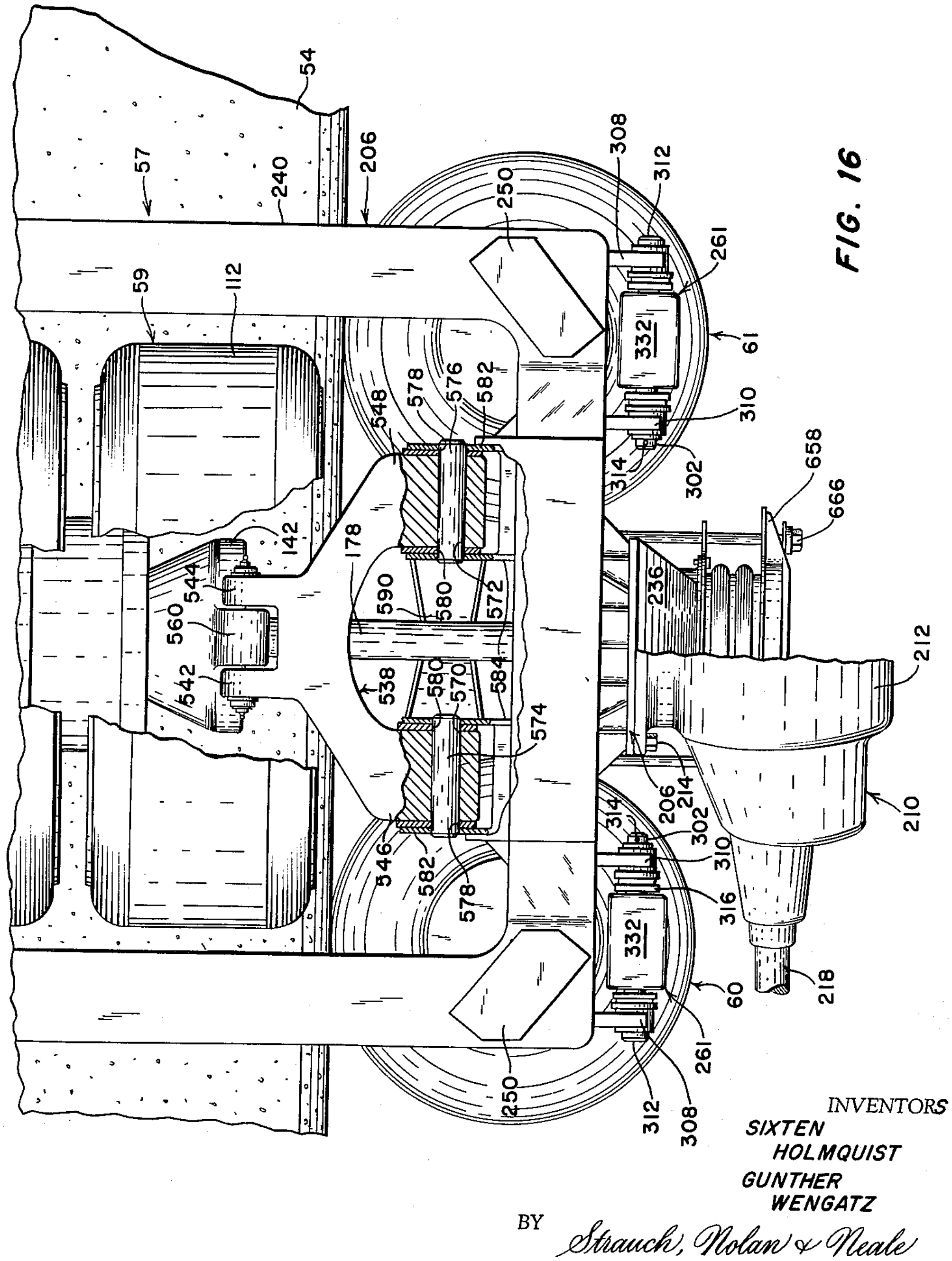
FIGURE 16 is an enlarged fragmentary sectional view taken substantially along lines 16—16 of FIGURE 6.

Referring now to FIGURES 6 and 16, bogie frame 206 is supported on axle housing 142 in spaced relation above monobeam 54 solely by means of a special spring cushioned parallelogram linkage 536 which functions to permit only relative parallel motion between axle housing 142 and frame 206 carrying the side guide wheels 60–65 and supporting the body of car 50. Linkage 536 includes upper and lower links 538 and 540 extending between axle housing 142 and the side of cross piece 240 adjacent carrier 210. Upper link 538 extends longitudinally with respect to axle housing 142 and is bifurcated at both ends to provide parallel spaced apart integral ears 542 and 544 adjacent axle housing 142 and parallel spaced apart ears 546 and 548 adjacent to cross piece 240.

Figure 17:
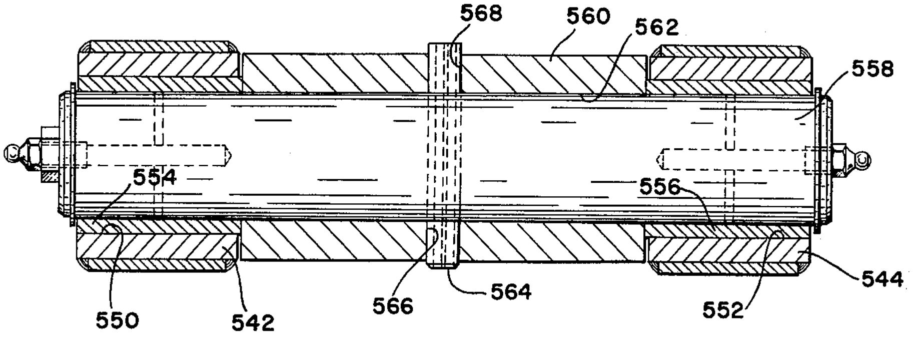
FIGURE 17 is an enlarged fragmentary sectional view taken substantially along lines 17—17 of FIGURE 6.

As shown in FIGURES 16 and 17, ears 542 and 544 are formed with axially aligned smooth cylindrical bores 550 and 552 in which sleeve bearings 554 and 556 are respectively received. Bearings 554 and 556 journal opposite ends of a cylindrical pin 558 which bridges ears 542 and 544 for pivotally connecting link 538 to axle housing 142.

In the assembly, an integral ear 560 projecting upwardly from the end of axle housing 142 adjacent carrier 210 extends between ears 542 and 544 and has a smooth cylindrical bore 562 receiving the intermediate portion of pin 558 along an axis extending perpendicularly to the longitudinal axis of axle housing 142. A small cylindrical retainer pin 564 extends through a bore formed in pin 558 along an axis normally intersecting the pin pivot axis and protrudes at opposite ends into axially aligned bores 566 and 568 formed in ear 560 to nonrotatably and axially retain pin 558 in place in bore 562.

With continued reference to FIGURE 16, ears 546 and 548 at the opposite end of link 538 are respectively formed with axially aligned through bores 570 and 572 extending along an axis which is parallel to the axis of bore 562. Cylindrical pivot pins 574 and 576 are respectively suitably journalled in bores 570 and 572 with each of the pins 574 and 576 projecting at both ends beyond their respective bores 570 and 572. Pin 574 is received at opposite ends in axially aligned bores 578 and 580 respectively formed in parallel spaced apart support brackets 582 and 584 which are fixed to frame 206 on opposite sides of ear 546. Pin 574 is axially retained in place on brackets 582 and 584 by any suitable means (not shown). The bracket support structure for pin 576 is the same as that just described for pin 574 with like reference numerals designating like parts.

By the foregoing construction, it is clear that link 538 is pivotally connected at its inner end to axle housing 142 and at its outer end to frame 206.

Figure 19:
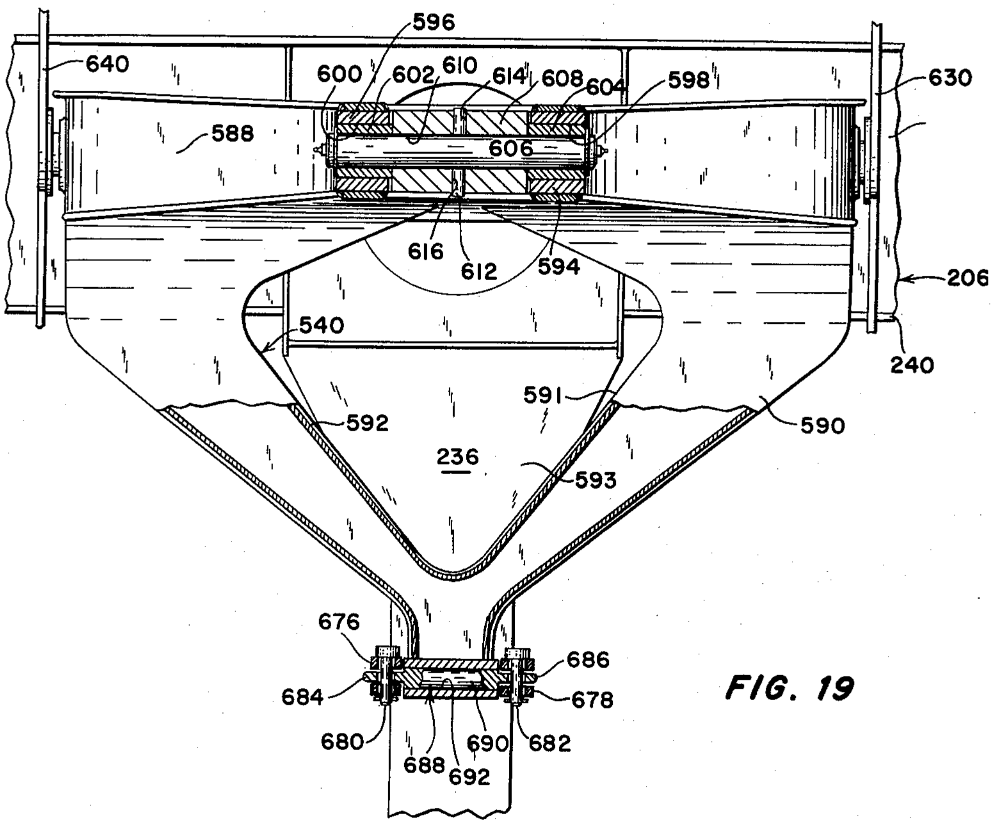
FIGURE 19 is a fragmentary sectional view taken substantially along lines 19—19 of FIGURE 6.

Referring now to FIGURES 6 and 19, link 540 comprises a bell crank type lever having integral arms 588 and 590 extending generally at right angles to each other. Arms 588 and 590 are formed by two curved symmetrically arranged structural plate sections 591 and 592 rigidly joined together near the ends of arms 588 and 590 and are intermediately bowed apart to provide a generally heart-shaped opening indicated at 593. The outer end of arm 588 terminates in a pair of parallel spaced apart ears 594 and 596 respectively formed with axially aligned smooth cylindrical bores 598 and 600 shown in FIGURE 19 and respectively receiving sleeve bearings 602 and 604.

Figure 18:
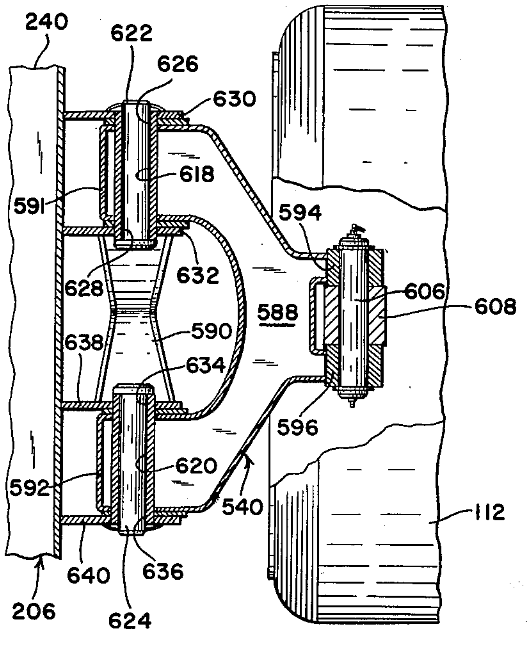
FIGURE 18 is a fragmentary sectional view taken substantially along lines 18—18 of FIGURE 6.

With continued reference to FIGURES 6, 18 and 19, a cylindrical pivot pin 606 bridging ears 594 and 596 is directly journalled at opposite ends in sleeve bearings 602 and 604. In the assembly, an ear 608 formed integral with axle housing 142 diametrically opposite from ear 560 extends downwardly between ears 594 and 596 and is formed with a smooth cylindrical bore 610 through which pin 606 interfittingly extends. The axis of bore 610 is parallel to that of bore 562 and thus is normal to the longitudinal axis of axle housing 142. Pin 606 is non-rotatably and axially retained in place in bore 610 by means of a small cylindrical retainer pin 612 extending through a bore formed in pin 606 perpendicularly of the longitudinal axis thereof. Pin 612 protrudes at opposite ends beyond the periphery of pin 606 and is received in axially aligned bores 614 and 616 formed in ear 608 at right angles to the axis of bore 610.

As shown in FIGURE 18, sections 591 and 592 of link 540 are respectively formed with axially aligned smooth cylindrical bearing bores 618 and 620 substantially at the intersection of arms 588 and 590. Cylindrical pivot pins 622 and 624 are respectively suitably journalled in bores 618 and 620 with each of the pins 622 and 624 projecting at both ends beyond their respective bores. Pin 622 is received at opposite ends in axially aligned bores 626 and 628 respectively formed in inwardly extending support brackets 630 and 632 which are fixed, as by welding, to frame 206 on opposite sides of section 591. Similarly, pin 624 is received at opposite ends in axially aligned bores 634 and 636 respectively formed in inwardly extending 638 and 640 fixed to frame 206 with bores 634 and 636 axially aligning with bores 626 and 628 along a common axis which is parallel to the axis of bore 610 in ear 608. Pins 622 and 624 are suitably retained axially in place and are supported from frame 206 by their respective pairs of brackets 630, 632, and 638, 640.

With the foregoing construction, it is clear that link 540 is pivotally connected to axle housing 142 at the end of arm 588 and to frame 206 substantially at the intersection of arms 588 and 590. The axes of pins 558, 574, 576, 606, 622 and 636 are all mutually parallel. The axes of pivot pins 622 and 624 are, as best shown in FIGURE 6, vertically below pins 574 and 576 respectively with the axes of pins 622, 624, 574 and 576 being contained in a common plane passing perpendicular to the longitudinal centerline of car 50. Arm 588 thus extends substantially parallel to the top surface of beam 54 and to link 538 and is located vertically below link 538. Link 538 and arm 588 of link 540 form the upper and lower pivot elements of the parallelogram linkage 536 and cooperate to confine relative motion between frame 206 and axle housing 142 to movement in parallel paths.

As shown in FIGURES 6 and 19, arm portion 590 extends downwardly to a region below side guide wheels 60 and 61 but above guide wheel 62 and is operatively connected at its lower end to a pneumatic spring 644 by means to be presently described. Spring 644 comprising a longitudinally expansible and contractible bellows 645 of synthetic rubber or other resilient air retentive elastomeric material mounted on a base plate 646. Base plate 646 is provided with a radial coupling flange mating with a complemental flange 650 and secured thereto as by nut and bolt assemblies 652. Flange 650 is formed with frame arm 236 to thereby anchor the inner end of spring 644 to frame 206 in the region of arm 590.

Figure 20:
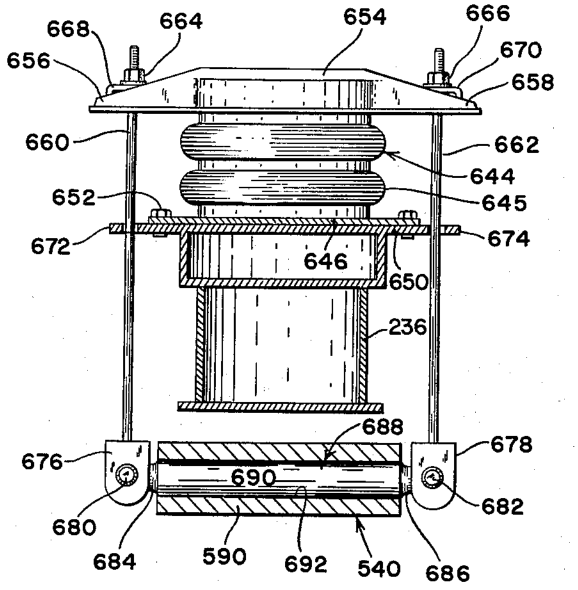
FIGURE 20 is a fragmentary sectional view taken substantially along lines 20—20 of FIGURE 6.

As best shown in FIGURES 6 and 20, spring 644 extends laterally outwardly from frame arm 236 along an axis which is parallel to the axis of axle housing 142 with the axes of spring 644 and axle housing 142 being contained in a common plane extending perpendicular to the top surface of monobeam 54. Spring 644 has an outer end closure wall 654 formed with diametrically opposed rigid ears 656 and 658 (FIGURE 20) extending radially beyond the periphery of bellows 645. Ears 656 and 658 are apertured to freely receive force transmitting connector rods 660 and 662 respectively. Rods 660 and 662 extend outwardly beyond their respective ears 656 and 658 and terminate in threaded end sections respectively mounting stop nuts 664 and 666. Stop members 668 and 670 axially retained on rods 660 and 662 by nuts 664 and 666 respectively are adapted to abut ears 656 and 658 for limiting outward axial expansion of bellows 645.

With continued reference to FIGURES 19 and 20, rods 660 and 662 extend inwardly on opposite sides of bellows 645 and frame arm 236 along axes parallel to the longitudinal axis of bellows 645. Rods 660 and 662 respectively pass through apertures in radial guide ears 672 and 674 formed rigid with frame arm 236. Mounted on the inner ends of rods 660 and 662 inwardly of frame arm 236 are clevises 676 and 678 which are respectively secured as by pins 680 and 682 to opposed flat sided end sections 684 and 686 of a pin 688. Pin 688 is formed with an intermediate cylindrical section 690 integrally joining end sections 684 and 686 and journalled in a smooth cylindrical bore 692 formed in the lower end of arm 590 along an axis normal to the axis of bellows 645 and parallel to the axes of pivot pins 622 and 624.

A motor driven compressor (not shown) providing a reservoir of pressurized air and preferably housed in one of the compartments formed by partitions 100 and 101 is connected by a suitable conduit (not shown) to bellows 645. The air pressure expanding bellows 645 is maintained at such a predetermined magnitude that link 540 is biased through the connection of rods 660 and 662 in a clockwise direction (as viewed from FIGURE 6) essentially to the position shown in the drawings. By maintaining a predetermined air pressure in bellows 645, a cushioning spring force is thus applied to the lower end of arm 590 to spring bias frame 206 to the raised predetermined position above the top surface of beam 54 shown in the drawings.

With the foregoing parallelogram linkage and spring structure, it is clear that frame 206 and, consequently, the forward end of car 50 is spring suspended on axle housing 142. This construction eliminates the undes'rable transmission of shocks from the axle to frame 206 and consequently to the body of car 50 and provides an air cushioned smooth ride throughout the entire loading range of the car. When car 50 is loaded, as with passengers, spring 644 being under substantially constant pressure deflects slightly permitting frame 206 to sink downwardly a small distance. Since carrier 210 is carried by frame 206, there will be a slight displacement of the carrier output shaft 208 relative to hub cap member 164 with the result that axle drive shaft 178 will be articulated about universal joint 182 to a position where it is sloped downwardly with respect to the planner top surface of beam 54 as illustrated in an exaggerated manner in FIGURE 8.

It also will be appreciated that with the foregoing novel frame suspension linkage, spring 644 constitutes the sole spring device supporting frame 206 on axle housing 142, thus eliminating the need for a plurality of spring devices as employed in prior art bogie constructions. As a result, the present invention provides for a more simplified spring suspension construction having fewer bulky pneumatic spring components than prior structures to permit the bogie assembly of the present invention to be made more compact and with less complication.

Since the construction of bogie assembly 58 is the same as that of bogie assembly 57, it is evident that only two springs 644 (one for each of the assemblies 57 and 58) are employed to insulate the body of car 50 from track shock to thus provide a stabilized cushioned ride in addition to minimizing stresses on the car body and on the components of the supporting bogie assemblies 57 and 58. As previously described, bogie assembly 58 is turned 180 degrees with respect to assembly 57 so that the two springs 644 of assemblies 57 and 58 so that spring 644 of assembly 58 is located on one side of car 50 adjacent skirt 99 and spring 644 of assembly 57 is located on the opposite side of car 50 adjacent skirt 98a. With this structure, the biasing force exerted by spring 644 in assembly 57 is equal and opposite to the biasing force exerted by the spring 644 of assembly 58.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A monobeam supported vehicle comprising a vehicle body and a pair of truck assemblies, each comprising:
(a) a truck frame,
(b) a single load carrying axle, (c) a wheel assembly journalled on said axle and adapted to ride along a monobeam,
(d) means spring suspending said axle on said frame, and
(e) means pivotally supporting the opposite ends of said vehicle body on the respective truck frames,
(f) said suspending means including a parallelogram linkage interconnecting said axle and said truck frame and spring means operatively interposed between said axle and said truck frame and resiliently biasing said frame upwardly with respect to said axle.
(g) the pivot axes of the links of said linkage extending parallel to the top of said mononbeam and normal to the axis of rotation of said wheel assembly upon said axle.

2. A monobeam supported vehicle comprising:
(a) a vehicle body,
(b) a pair of truck assemblies each comprising a rigid truck frame, and
(c) means pivotally supporting said vehicle body at opposite ends on the truck frame of each of said truck assemblies, each of said truck assemblies further comprising:
(d) a rigid axle,
(e) a load carrying wheel assembly journalled on said axle, and adapted to ride along the top surface of a monobeam,
(f) means suspending said frame upon said axle,
(g) at least two monobeam side engaging guide wheels disposed on each side of said frame equidistantly forwardly and rearwardly of the rotational axis of said wheel assembly, and
(h) means individually suspending each of said guide wheels from said frame and including torsion spring means biasing each of said guide wheels laterally inwardly for riding engagement with the sides of said monobeam to maintain said body in centered relation with respect to said monobeam, and
(i) means journalling each of said guide wheels about an axis substantially normal to the axis of said load carrying wheel assembly.

3. A monobeam supported vehicle comprising a vehicle body and a pair of truck assemblies, each comprising:
(a) a rigid truck frame,
(b) a load carrying axle,
(c) a wheel assembly journalled on said axle and adapted to ride along the top surface of a monobeam,
(d) means spring suspending said axle on said frame and including a linkage in the form of a parallelogram, said frame and axle being constrained to relative parallel movement by said linkage, and
(e) means pivotally supporting the opposite ends of said vehicle body on the respective truck frames.

4. The monobeam supported vehicle defined in claim 3 wherein said suspending means further comprises spring means operatively interposed between said axle and said truck frame and resiliently biasing said frame upwardly with respect to said axle.

5. The vehicle defined in claim 4 wherein the pivot axes of the links of said linkage extend parallel to the top of the monobeam.

6. The vehicle defined in claim 4 wherein said spring means is operatively interposed between said frame and one of the links of said linkage.

7. The combination defined in claim 3 wherein said wheel assembly comprises a hub and a pneumatic tire equipped wheel fixed to said hub.

8. The combination defined in claim 7 wherein the tire of said wheel assembly has sufficient axial flexibility to permit axial displacement of said hub relative to the tread of said tires to permit said wheels to round curves in the monobeam of a radius in the order of 600 feet or greater without material wear producing side slippage of said tire treads with respect to the supporting surface of the monobeam.

9. The vehicle defined in claim 3 wherein said vehicle body has a flat floor structure extending from end to end thereof, said floor being interrupted solely by wheel housing projecting above the level thereof at each end of said floor structure and enclosing the wheels of said trucks.

10. The vehicle defined in claim 9 wherein a pair of passenger seats is mounted in back to back relation upon each of said wheel housings and facing the opposite sides of said vehicle body and the portions of said floor intermediate said seats and the adjacent body sides form passageways permitting walking between coupled vehicles.

11. The vehicle defined in claim 3 wherein said truck frame has a central through opening and wherein said wheel assembly is disposed within the interior of said opening.

12. The vehicle defined in claim 3 wherein coacting wear plates are provided upon the bottom of said body and the tops of each of said truck frames to define the path of rotation of said body with respect to said truck frames.

13. The monobeam supported vehicle defined in claim 3 wherein said axle is open at both ends and said truck assembly further comprising:

(a) a drive axle shaft extending freely rotatable through said axle and projecting at both ends axially beyond said axle.

(b) means including a universal joint drive connecting one end of said axle shaft to said wheel assembly, and (c) a prime mover drivingly connected to the other end of said shaft.

14. The monobeam supported vehicle defined in claim 13 wherein said truck assembly further comprises a brake mechanism operatively connected to said shaft at said one end.

15. The monobeam supported vehicle defined in claim 13 wherein said prime mover comprises a motor having an output shaft member rotatable about an axis extending normal to the rotational axis of said axle shaft and means having mutually perpendicular input and output elements respectively coupled to said output shaft member and said axle shaft to establish a drive connection between said output shaft and said axle shaft.

16. The monobeam supported vehicle defined in claim 2 wherein said means suspending said guide wheels comprises a linkage forming a parallelogram permitting relative movement between said guide wheels and said frame only in parallel paths.

17. The monobeam supported vehicle defined in claim 2, comprising a safety wheel mounted coaxially with each of said guide wheels in juxtaposed relationship thereto, the outside diameter of said safety wheel being less than that of said guide wheel with said guide wheel having a pneumatic tire adapted to engage the side of said monobeam, said safety wheel being biased into engagement with the side surface of said monobeam by said torsion spring means only when said pneumatic tire is deflated by a predetermined magnitude.

18. A monobeam supported vehicle truck assembly comprising:

(a) a rigid truck frame, (b) a load carrying axle, (c) a wheel assembly journalled on said axle and adapted to ride along the top surface of a monobeam, and (d) means spring suspending said axle on said frame comprising a linkage in the form of a parallelogram, said frame and said axle being constrained to relative parallel movement by said linkage.

19. The monobeam supported vehicle truck assembly defined in claim 18 wherein said frame comprises a rigid portion so arranged as to encircle said axle and said wheel assembly in the vicinity of the rotationed axis of said wheel assembly.

20. The monobeam supported truck assembly defined in claim 19 wherein said linkage comprises a first and second link each pivotally connected to said frame and said axle with said second link being vertically below said first link.

References Cited by the Examiner

UNITED STATES PATENTS

| | | | |
|---|---|---|---|
| 1,600,767 | 9/26 | Lockwood | 104—120 |
| 2,191,408 | 2/40 | Maris | 105—210 |
| 2,731,922 | 1/56 | Robb | 105—156 |
| 2,756,689 | 7/56 | Hinsken et al. | 105—145 |
| 2,853,956 | 9/58 | Wenner-Gren et al. | 104—120 |
| 3,010,411 | 11/61 | Peras | 104—247 X |
| 3,048,127 | 8/62 | Oberpaul | 105—145 |
| 3,095,828 | 7/63 | Deller | 105—144 |

FOREIGN PATENTS

| | | |
|---|---|---|
| 1,123,692 | 2/62 | Germany. |

EUGENE G. BOTZ, *Primary Examiner.*

LEO QUACKENBUSH, *Examiner.*